(12) United States Patent
Formwait et al.

(10) Patent No.: US 11,674,772 B2
(45) Date of Patent: Jun. 13, 2023

(54) VIRTUAL REALITY SYSTEM FOR USAGE WITH SIMULATION DEVICES

(71) Applicant: Street Smarts VR, New York, NY (US)

(72) Inventors: Alice Formwait, New York, NY (US); Jeffrey Jarrard, New York, NY (US)

(73) Assignee: Street Smarts VR, New York, NY (US)

( * ) Notice: Subject to any disclaimer, the term of this patent is extended or adjusted under 35 U.S.C. 154(b) by 265 days.

(21) Appl. No.: 16/930,060

(22) Filed: Jul. 15, 2020

(65) Prior Publication Data
US 2021/0018292 A1      Jan. 21, 2021

Related U.S. Application Data

(60) Provisional application No. 62/874,234, filed on Jul. 15, 2019.

(51) Int. Cl.
| | | |
|---|---|---|
| *F41A 33/00* | (2006.01) | |
| *G06F 3/01* | (2006.01) | |
| *G06T 15/20* | (2011.01) | |
| *F41A 9/61* | (2006.01) | |
| *G02B 27/01* | (2006.01) | |
| *G09B 9/00* | (2006.01) | |

(52) U.S. Cl.
CPC ............ *F41A 33/00* (2013.01); *F41A 9/61* (2013.01); *G02B 27/0172* (2013.01); *G06F 3/011* (2013.01); *G06F 3/016* (2013.01); *G06T 15/20* (2013.01); *G09B 9/003* (2013.01)

(58) Field of Classification Search
None
See application file for complete search history.

(56) References Cited

U.S. PATENT DOCUMENTS

| | | | |
|---|---|---|---|
| 8,690,575 B1 | 4/2014 | Gurule et al. | |
| 10,271,040 B1* | 4/2019 | Marchak, Jr. | ......... G06V 20/42 |
| 10,274,287 B2* | 4/2019 | Northrup | ............. F41G 3/2655 |
| 2006/0105299 A1 | 5/2006 | Ferris et al. | |
| 2008/0127538 A1 | 6/2008 | Barrett et al. | |
| 2013/0189656 A1* | 7/2013 | Zboray | .................. G06F 3/011 |
| | | | 434/219 |
| 2014/0065577 A1 | 3/2014 | Quinlan et al. | |
| 2014/0274240 A1* | 9/2014 | Meadows | ............. A63F 13/216 |
| | | | 463/3 |

(Continued)

OTHER PUBLICATIONS

Kinateder et al. "Using an Augmented Reality Device as a Distance-based Vision Aid—Promise and Limitations", Optom Vis Sci 2018 vol. 95(9) (Year: 2018).*

(Continued)

*Primary Examiner* — Yingchun He
(74) *Attorney, Agent, or Firm* — Meister Seelig & Fein PLLC

(57) ABSTRACT

A simulation device including a switch that is articulated with a trigger mechanism and a tracker interface coupled to the simulation device, the tracker interface including an electrical connection interface with a virtual reality tracker that communicates with a virtual reality computing device, wherein the electrical connection interface transmits electrical signals to the virtual reality tracker based on articulations of the switch.

20 Claims, 21 Drawing Sheets

(56) References Cited

U.S. PATENT DOCUMENTS

| | | | |
|---|---|---|---|
| 2015/0050622 A1* | 2/2015 | Wendt | F41G 3/26 434/16 |
| 2017/0307333 A1 | 10/2017 | Northrup et al. | |
| 2019/0213901 A1 | 7/2019 | Kur et al. | |

OTHER PUBLICATIONS

PCT International Search Report and The Written Opinion of the International Searching Authority, dated Oct. 29, 2020, International Searching Authority.

\* cited by examiner

Fig. 22

VIRTUAL REALITY SYSTEM FOR USAGE WITH SIMULATION DEVICES

CROSS REFERENCE TO RELATED APPLICATION

This application claims the priority of U.S. Provisional Application No. 62/874,234, entitled "MAGAZINE SIMULATOR FOR USAGE WITH WEAPONS IN A VIRTUAL REALITY SYSTEM," filed on Jul. 15, 2019, the disclosure of which is hereby incorporated by reference in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

Field of the Invention

This application generally relates to a virtual reality simulator, and in particular, magazine simulators for guns that provide an interface with virtual reality systems.

Description of the Related Art

It has long been desired to provide personnel training to improve their skills in aiming and firing shotguns, rifles, handguns, and other weapons. Law enforcement and military training often place trainees into situations that require quick visual and mental assessment of the situation as well as an appropriate response with a weapon. Trainees are often subjected to adverse situations to test their abilities to effectively react.

Traditional training methods in marksmanship and firing tactics for hunters and other sportsmen, police, military personnel, and others, leave much to be desired from the aspects of realism, cost and practicality. Many firing ranges have limited capacity. Moreover, most existing firing ranges do not provide protection for the shooter against the natural elements such as rain or snow. Because of the noise levels normally associated with firing ranges, they are typically located in remote areas requiring people to have to drive to remote locations. The ammunition, targets and use costs for the range, make such training expensive. Furthermore, when live ammunition is used, expense, risks, administrative problems, safety concerns, and government rules and regulations are more burdensome. For training in marksmanship and tactics, it is beneficial to have an indoor range where shooters can fire simulated projectiles against simulated moving targets.

Video games are increasingly more realistic where users may be placed into immersive virtual environments. First-person-view shooting games offer players the ability to perform actions such as walking, crouching, shooting, etc., using a mouse and keyboard. However, these games are usually played in front of a computer where the user is sitting in a chair and are adequate for personnel training. Virtual reality systems may improve gaming experience where the player's movement in the game is dependent on their actions in physical space which makes the game more immersive than a traditional video game. Despite the realism provided by virtual reality systems, players are often provided with game controllers that are either tethered or have the look and feel of toys. As such, existing virtual reality game controllers that are representative guns differ from actual guns in feel and balance, and thus reduces the effectiveness of the training for real life.

There is thus a need to provide an improved shooting simulator and process.

SUMMARY OF THE INVENTION

The present invention provides a virtual reality system. According to one embodiment, the virtual reality system comprises a simulation device including a switch that is articulated with a trigger mechanism and a tracker interface coupled to the simulation device, the tracker interface including an electrical connection interface with a virtual reality tracker that communicates with a virtual reality computing device, wherein the electrical connection interface transmits electrical signals to the virtual reality tracker based on articulations of the switch.

The switch may be configured to transmit electrical signals to the tracker interface that are associated with articulations of the switch from pulling of the trigger mechanism. The simulation device may further include compressed gas or weights that modify balance and feel. The simulation device may also further include weights controlled by servo motors that generate force feedback based on the articulations of the switch. The switch may be further configured with a trigger connection that is coupled to the trigger mechanism of the simulation device, wherein the trigger connection moves and engages with the switch upon pull of the trigger mechanism. The switch can be adjustably configured with a plurality of pull distances associated with the trigger mechanism. In certain embodiments, the simulation device may comprise an electronic control weapon.

The electrical connection interface may comprise a pin pad. The pin pad may include an electrical pin that corresponds to a signal from the switch associated with a pull of the trigger mechanism. The switch may be further articulated with a safety mechanism of the simulation device. The switch can be configured to transmit electrical signals to the tracker interface that are associated with articulations of the switch from switching of the safety mechanism between on and off positions. The pin pad includes an electrical pin that corresponds to a signal from the switch associated with the switching of the safety mechanism. The pin pads may be configured with contact connections of the virtual reality tracker. The virtual reality tracker may map the electrical signals into commands for the virtual reality computing device. The virtual reality computing device may also process the commands and renders corresponding images to a headset unit. The virtual reality tracker may include one or more sensors that detect a position of the simulation device within x, y and z coordinates of a space, and orientation including yaw, pitch and roll.

According to another aspect of the present invention, a virtual reality system is provided. The virtual reality system may comprise a simulation device, a tracker interface, and a virtual reality tracker, wherein the simulation device includes a switch that transmits signals to the tracker interface based on articulations of a trigger mechanism of the simulation device, and the tracker interface connects the signals to the virtual reality tracker. The virtual reality system further comprises a virtual reality computing device that is communicatively coupled to the simulation device, the virtual reality computing device executing instructions for rendering virtual reality scenarios to a trainee and depicting data in the virtual reality scenarios based on commands that are generated from the virtual reality tracker based on the signals.

According to one embodiment, the virtual reality system comprises simulation device and a virtual reality computing device that is communicatively coupled to the simulation device. The virtual reality computing device executing instructions that determine a location of a trainee based on a location of the simulation device, monitor for movements and signals from the simulation device, render virtual reality scenarios to the trainee and depicting data in the virtual reality scenarios based on the monitored movements and signals from the simulation device, and render proximity rings based on the tracker location and data structures indicating shapes, sizes, and distances from the trainee during a virtual reality scenario and in playback of the virtual reality scenario during a review mode.

The virtual reality computing device may further generate a review mode including a playback of the virtual reality scenario, wherein the review mode allows observation of the trainee and movements of the trainee from a plurality of perspectives during the playback. The plurality of perspectives may include at least a trainee perspective and vantage perspectives. Given ones of the virtual reality scenarios may include predetermined perspectives based on environment parameters of the given ones of the virtual reality scenarios. In one embodiment, the review mode includes overlay and control features utilized to review performance of the trainee in the virtual reality scenarios, the overlay and control features including a menu of options for selecting: vantage point, proximity rings, simulation boundaries, or objects/weapons highlights.

The virtual reality computing device to generate instructor audio that plays microphone output to the trainee during the virtual reality scenarios. The virtual reality computing device may also prescribe different actions to the proximity rings. In one embodiment, the different actions may include appropriate courses of action by the trainee that are based on the indicated distances with respect to a subject. The proximity rings may be rendered in given colors based on distance. The virtual reality scenarios may further include branching options that determine outcomes of the virtual reality scenarios based on instructor selections.

According to one embodiment, the virtual reality computing device executes instructions that perform the method comprising determining a location of a trainee based on a location of a simulation device that is communicatively coupled to the virtual reality computing device. The virtual reality computing device further executes instructions that perform monitoring for movements and signals from the simulation device, rendering virtual reality scenarios to the trainee and depicting data in the virtual reality scenarios based on the monitored movements and signals from the simulation device, and rendering proximity rings based on the tracker location and data structures indicating shapes, sizes, and distances from the trainee during a virtual reality scenario and in playback of the virtual reality scenario during a review mode.

A review mode may be generated including a playback of the virtual reality scenario, wherein the review mode allows observation of the trainee and movements of the trainee from a plurality of perspectives during the playback. The plurality of perspectives may include at least a trainee perspective and vantage perspectives. The given ones of the virtual reality scenarios may include predetermined perspectives based on environment parameters of the given ones of the virtual reality scenarios. The review mode may include overlay and control features utilized to review performance of the trainee in the virtual reality scenarios, the overlay and control features including a menu of options for selecting: vantage point, proximity rings, simulation boundaries, or objects/weapons highlights.

Instructor audio may also be generated that plays microphone output to the trainee during the virtual reality scenarios. Different actions may be prescribed to the proximity rings. In one embodiment, the different actions include appropriate courses of action by the trainee that are based on the indicated distances with respect to a subject. The proximity rings may be rendered in given colors based on distance. The virtual reality scenarios may also include branching options that determine outcomes of the virtual reality scenarios based on instructor selections.

BRIEF DESCRIPTION OF THE DRAWINGS

The invention is illustrated in the figures of the accompanying drawings which are meant to be exemplary and not limiting, in which like references are intended to refer to like or corresponding parts.

FIG. 22 illustrates an exemplary analytics screen according to an embodiment of the present invention.

DETAILED DESCRIPTION OF THE INVENTION

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the present invention. Likewise, a reasonably broad scope for claimed or covered subject matter is intended. Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

The present application discloses systems, devices, and methods that employ virtual reality to train police officers or military in the use of weapons like guns or electronic control weapons (e.g., those available from Taser™) in specific scenarios or situations. A trainee may be given an actual weapon or a training weapon that simulates an actual weapon and is connected to a virtual reality system. The trainee may wear goggles or headsets that are connected to the virtual reality system which plays a training scenario. Throughout the training scenario, the trainee's use of his weapon may be tracked and provided to the virtual reality system. The virtual reality system may include features used to review the trainee's performance, including a review mode which allows a reviewer to mark up the display, show different perspectives, how the weapon was held and pointed, and proximity rings which show how close the weapon got to various people in the virtual reality scenario.

Figure 1:
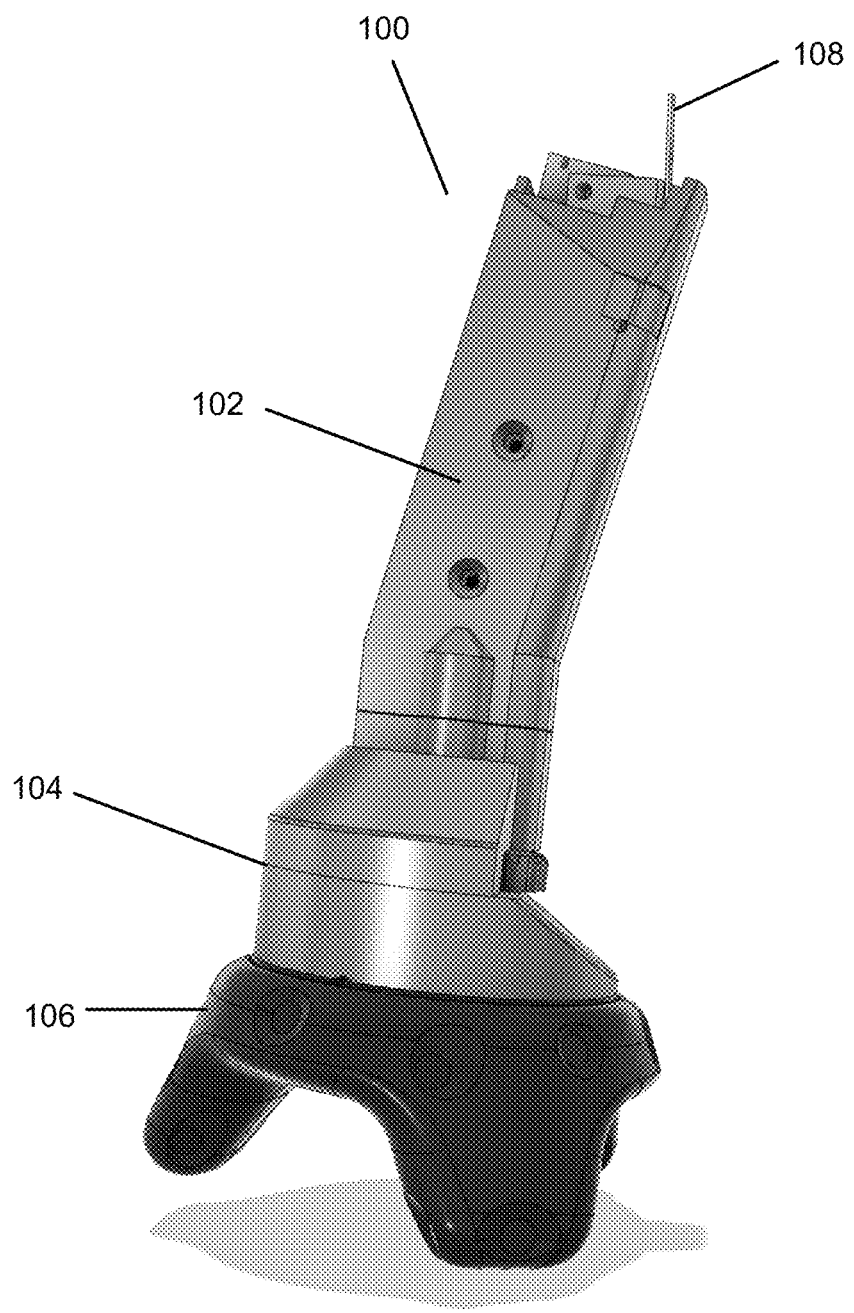
FIG. 1 illustrates a magazine simulator according to an embodiment of the present invention.

The disclosed system may include replacement gun magazine simulators that are connected to a virtual reality computing device. A magazine simulator may be inserted into an actual weapon (e.g., guns, air guns, or conducted electrical weapons capable of firing electro-shock projectiles, such as electronic control weapons) in place of a traditional magazine and bullets, or in a training weapon. The magazine simulator can track positioning and firing data and relay them to the virtual reality computing device. The magazine simulator may allow the user to holster and unholster the weapon, making it more useful in simulating real training FIG. 1 illustrates a magazine simulator according to an embodiment of the present invention. Magazine simulator 100 may be provided to a real gun, such as a Glock handgun, and operates or fires when a trigger of the gun is pulled. The magazine simulator may be inserted into a magazine well or a magazine inserting portion of a gun, according to an embodiment of the present invention. The magazine simulator 100 may comprise a box magazine 102, a tracker interface 104, and a tracker 106. The box magazine 102 may include a switch 108 that when inserted into a magazine well of a gun, may be articulated with a trigger or firing mechanism of the gun. Switch 108 may comprise one or more tabs, hooks or levers that are connected to electronic circuitry or sensors in box magazine 102. The switch 108 may be actuated by a gun trigger which may then connect an electrical signal from box magazine 102 to tracker interface 104. Box magazine 102 may further include weights for modifying the balance and feel of a gun when inserted. In one embodiment, force feedback may be provided by compressed gas or a weight controlled by servo motors within box magazine 102 for enhanced realism while firing (based on the articulations of the switch).

Figure 2:
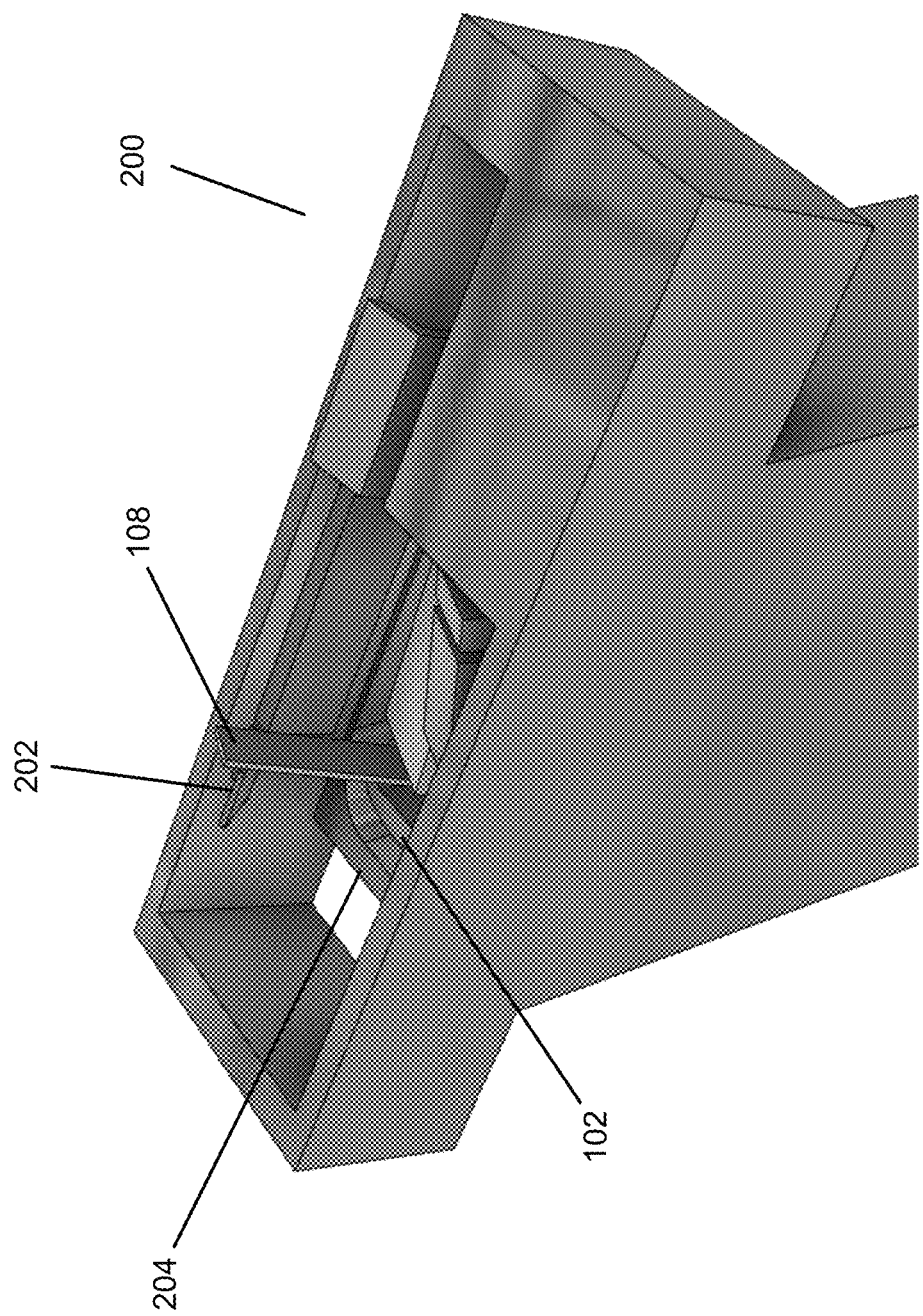
FIG. 2 illustrates a cutaway view of a handle portion of a gun including a magazine simulator according to an embodiment of the present invention.

FIG. 2 presents a cutaway view of a handle portion of a gun including a magazine simulator according to an embodiment of the present invention. The box magazine 102 can be inserted into magazine well 204 of gun 200. When inserted, switch 108 may be configured with trigger connection 202. Trigger connection 202 may be connected to a trigger (not illustrated) of the gun such that when the trigger is pulled, trigger connection 202 may move and engage with switch 108 which causes switch 108 to send a signal to tracker interface 104 to indicate that the trigger has been pulled. According to one embodiment, switch 108 may be adjustably configured with a plurality of trigger pull distances. Box magazine 102 may be suitable for insertion into magazine wells of traditional guns. However, components of box magazine 102 may be modified for other types of weapons, such as an electronic control weapon, where a battery pack may be inserted into the magazine well instead of a magazine with bullets.

Figure 3:
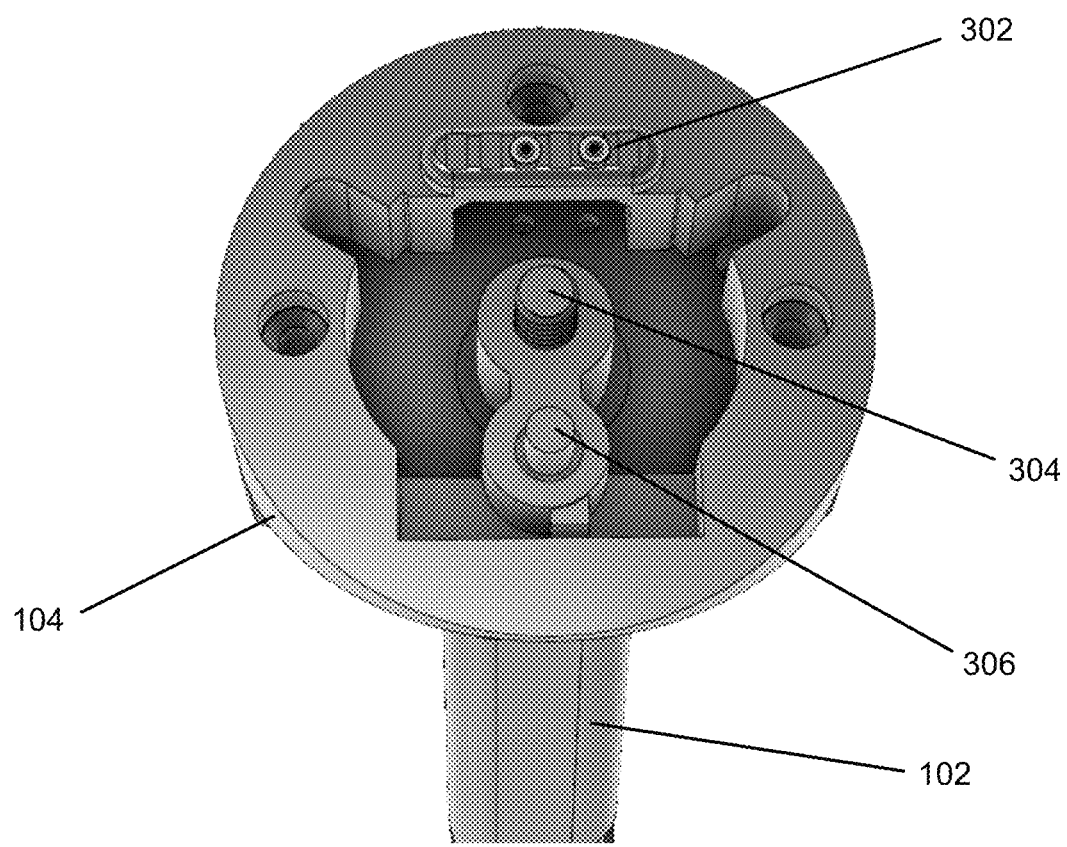
FIG. 3 illustrates a bottom view of a tracker interface according to an embodiment of the present invention.

FIG. 3 presents a bottom view of a tracker interface according to an embodiment of the present invention. Box magazine 102 may be assembled or attached to tracker interface 104. Tracker interface 104 may include pin pad 302, screwing bolt 304, and stabilizing pin 306. Pin pad 302 may include pins corresponding to given signals from switch 108 of box magazine 102. In the exemplary embodiment presented in FIG. 3, pin pad 302 includes two pins. For example, a first pin may correspond to a trigger pull signal and a second pin may correspond to a ground connection.

Figure 4:
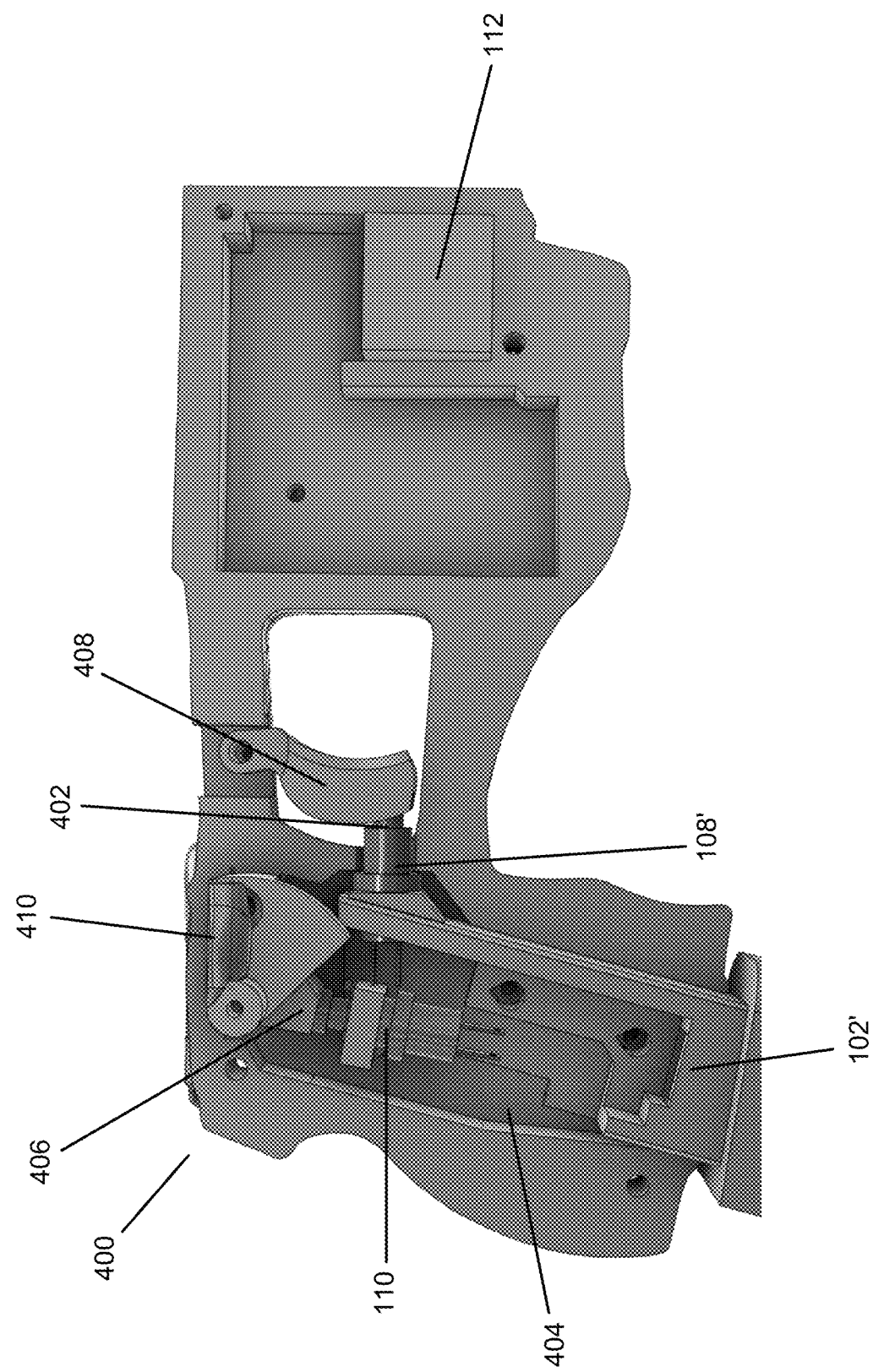
FIG. 4 illustrates a cutaway view of an electronic control weapon including a magazine simulator according to an embodiment of the present invention.

FIG. 4 presents a cutaway view of an electronic control weapon including a magazine simulator according to an embodiment of the present invention. Electronic control weapon 400 may include a magazine well 404 operable to receive a box magazine 102'. Box magazine 102' may include a switch 108' that may be actuated by trigger component 402 and a switch 110 operated by safety component 406. Safety component 406 may be correlated with on and off positions of a safety 410. Operation of the safety 410 may cause safety component 406 to transmits a signal to switch 110 that indicates the position of the safety 410 (e.g., either on or off). Trigger component 402 may be coupled to a trigger 408 of the electronic control weapon 400 such that when the trigger is pulled, trigger component 402 may communicate a signal to switch 108' that indicates the trigger 408 has been pulled. Switch 108' may relay signals from trigger component 402 and switch 110 may relay signals from safety component 406 to the tracker interface 104' illustrated in FIG. 5. Electronic control weapon 400 may further include a weight 112 that provides a weight and feel of a realistic (e.g., electronic) weapon.

Figure 5:
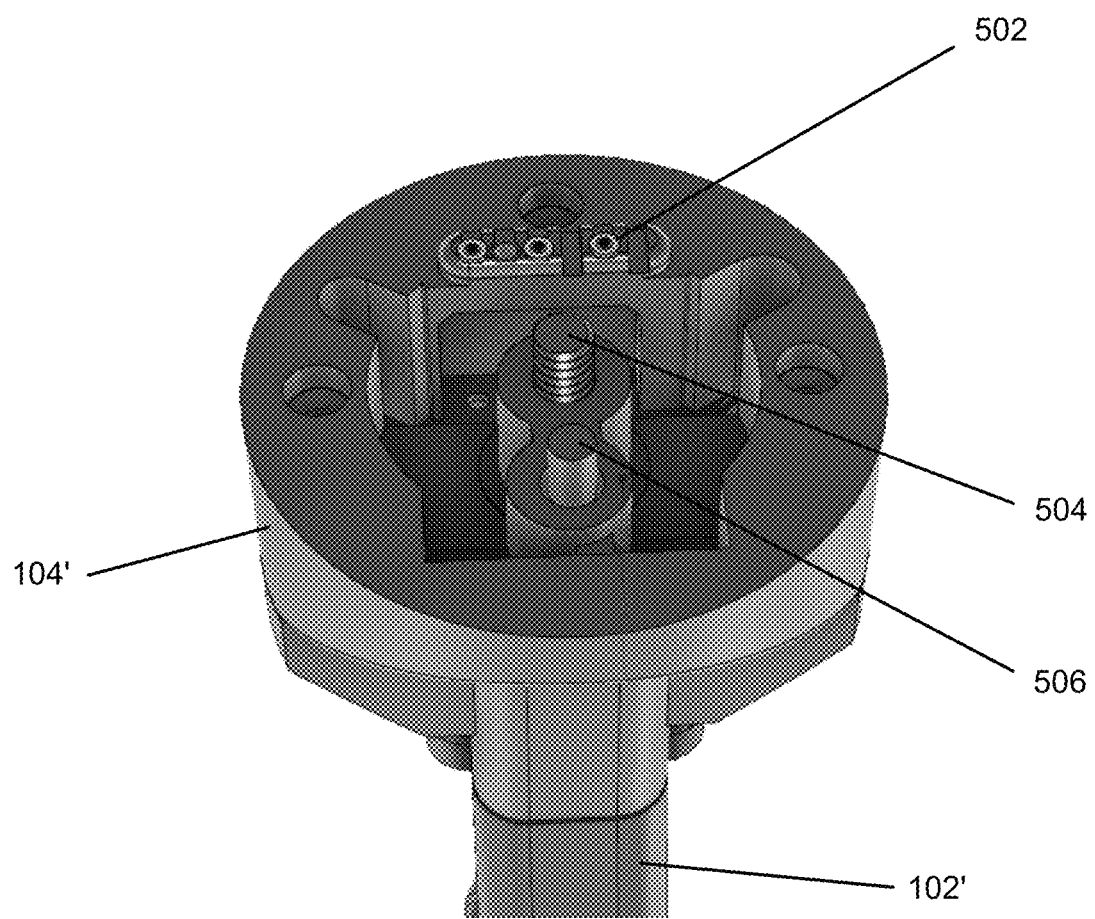
FIG. 5 illustrates a bottom view of a tracker interface according to another embodiment of the present invention.

FIG. 5 presents a bottom view of a tracker interface according to another embodiment of the present invention. Box magazine 102' may be assembled or attached to tracker interface 104'. Tracker interface 104' includes pin pad 502, screwing bolt 504, and stabilizing pin 506. In this exemplary embodiment, pin pad 502 includes three pins, e.g., a first pin may correspond to a trigger pull signal, a second pin may correspond to a safety position, and a third pin may correspond to a ground connection. Pin pad 502 may include pins corresponding to given signals from switches 108' and 110 of box magazine 102'.

Signals from switches 108, 108', or 110 may be transmitted to tracker interfaces 104, 104', respectively, and activate corresponding electrical switches to pin pads 302 and 502. Articulations from gun 200 or electronic control weapon 400 that are communicated to any ones of switches 108, 108', or 110 are not limited to trigger pulls and safety positions and may include other actions, events or signals that may be generated from weapons. Pin pad 302 and 502 may provide an electrical connection interface with tracker 106.

Figure 6:
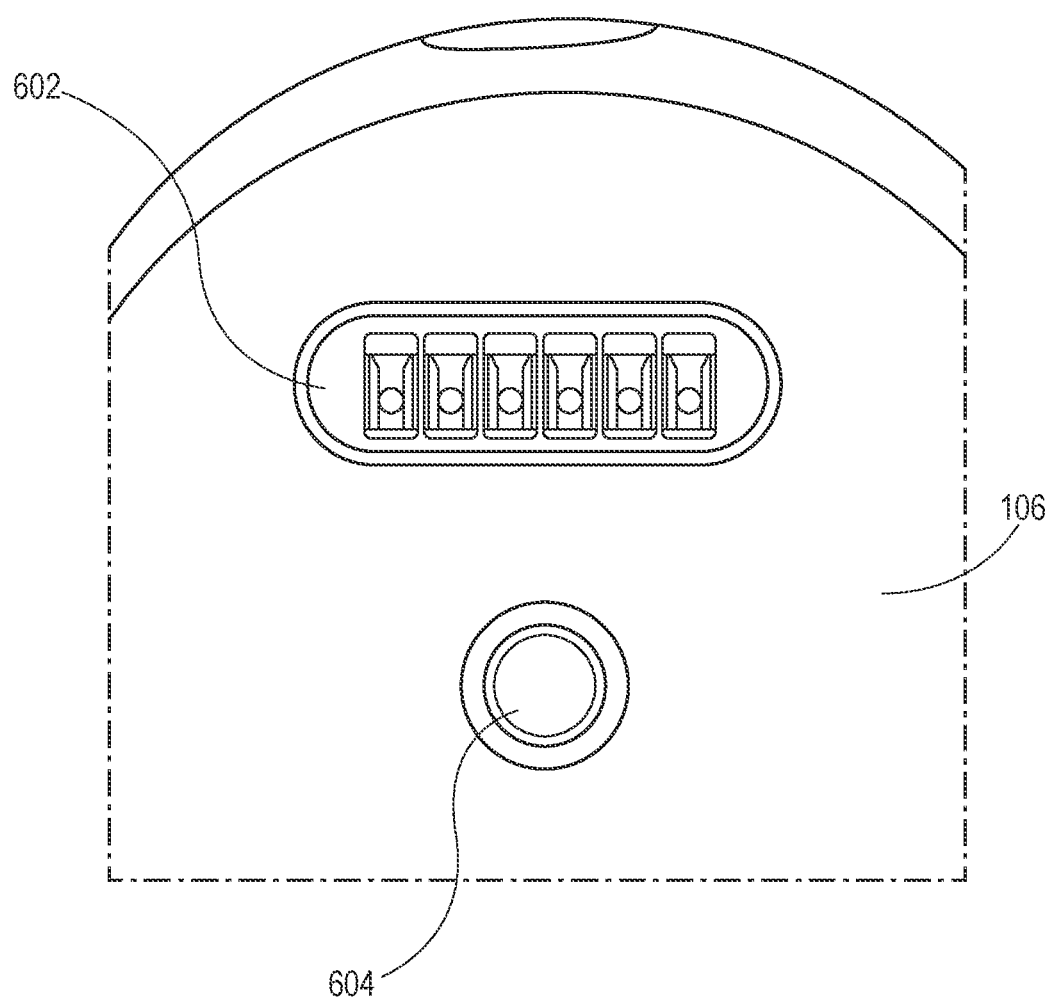
FIG. 6 illustrates a tracker according to an embodiment of the present invention.

FIG. 6 presents a tracker according to an embodiment of the present invention. Tracker 106 may comprise hardware configured to track and link actions, events or signals from gun 200 or electronic control weapon 400 to a virtual reality computing device. Tracker interfaces 104, 104' may be attached to tracker 106 to facilitate communications between gun 200 or electronic control weapon 400 wirelessly to the virtual reality computing device. According to one embodiment, the virtual reality computing device may comprise a server running a Unity engine (Unity Technologies) that is interface with a tracker 106 that includes hardware, software, and software development tools from virtual reality providers such as VIVE™.

Signals from pin pads 302 and 502 on tracker interfaces 104 and 104' may be convey to tracker 106 via pogo pin connector 602. Pogo pin connector 602 may comprise a plurality of spring-loaded pins that support electrical connection with pins on pin pads 302, 502. Signals from the pins on pin pads 302, 502 may be mapped into commands based on contact connections with corresponding pins on pogo pin connector 602. The commands generated on tracker 106 may be received and interpreted by the virtual reality computing device.

Tracker interfaces 104 and 104' may be mated with tracker 106 by inserting stabilizing pin 306 and 506, respectively, into a stabilizing pin recess (not illustrated) of tracker 106. The stabilizing pins 306, 506 provide proper alignment and contact between pin pads 302, 502 and pogo pin connector 602. Tracker 106 may further include image sensors and/or non-optical sensors (e.g., utilizing sound waves or magnetic fields) that can be installed in hardware to track the movement of a user's body. According to another embodiment, optical markers may be placed on tracker 106 (or alternatively on magazines 102, 102', or tracker interfaces 104, 104') for motion tracking using cameras to track movement of a user.

Figure 7:
FIG. 7 illustrates a front handle view of a handgun loaded with a magazine assembly according to an embodiment of the present invention.

Tracker interfaces 104, 104' may be secured to tracker 106 by securing screwing bolts 304, 504 to mount 604. Screwing bolts 304, 504 may be tightened and loosened from mount 604 via a thumbwheel 114 as illustrated in FIG. 7. FIG. 7 illustrates a front handle view of a gun loaded with a magazine assembly according to an embodiment of the present invention. The thumbwheel may be tightened until the tracker interface (104, 104') is securely fixed in place with tracker 106. As such, an assembly of box magazine 102, 102', tracker interface 104, 104, and tracker 106 provides a magazine simulator 100 provides a virtual reality controller device that can be holstered and unholstered, useful in simulating real training.

Figure 8:
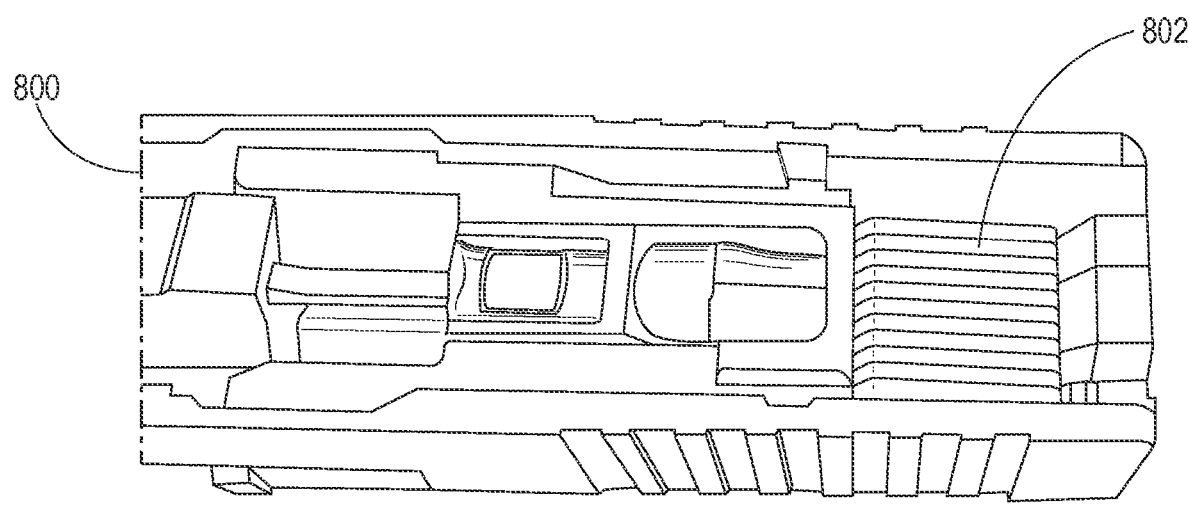
FIGS. 8 and 9 illustrate repeater mechanisms according to embodiments of the present invention.
Figure 9:
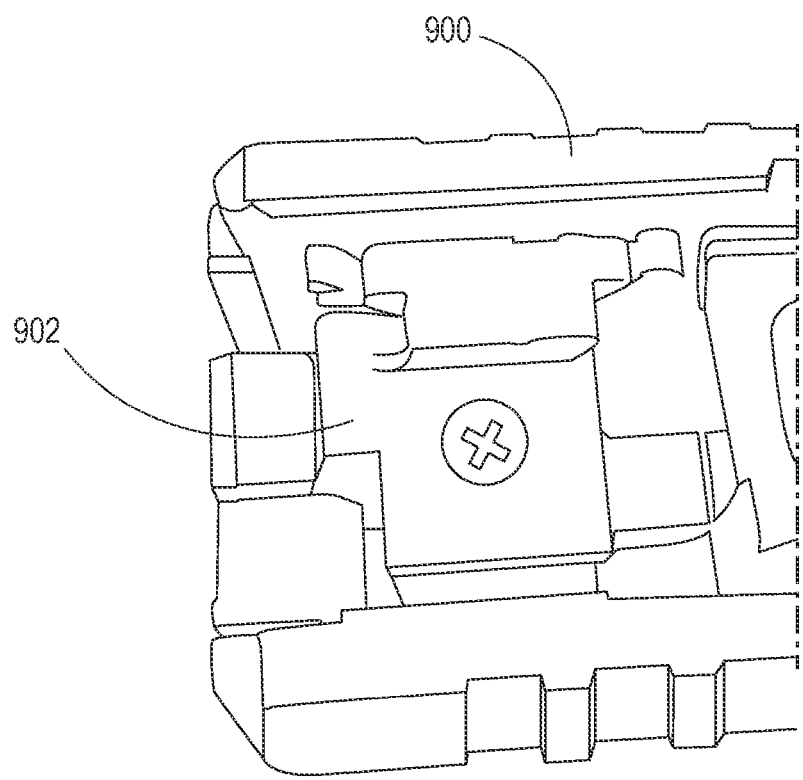

FIG. 8 presents a repeating mechanism according to an embodiment of the present invention. Certain guns may include a slide lock or release that functions to lock a slide in its "back" position when a gun has expended all ammunition from a magazine. To prohibit a gun from locking its slide, a repeater 802 may be inserted into a slide 800 of a gun. The repeater 802 may disable a slide lock or slide release to prohibit the slide 800 from locking upon firing with an empty magazine (e.g., box magazine 102, 102'). Similarly, FIG. 9 depicts a repeater 902 comprising a fitted piece that may be secured to slide 900.

Figure 10:
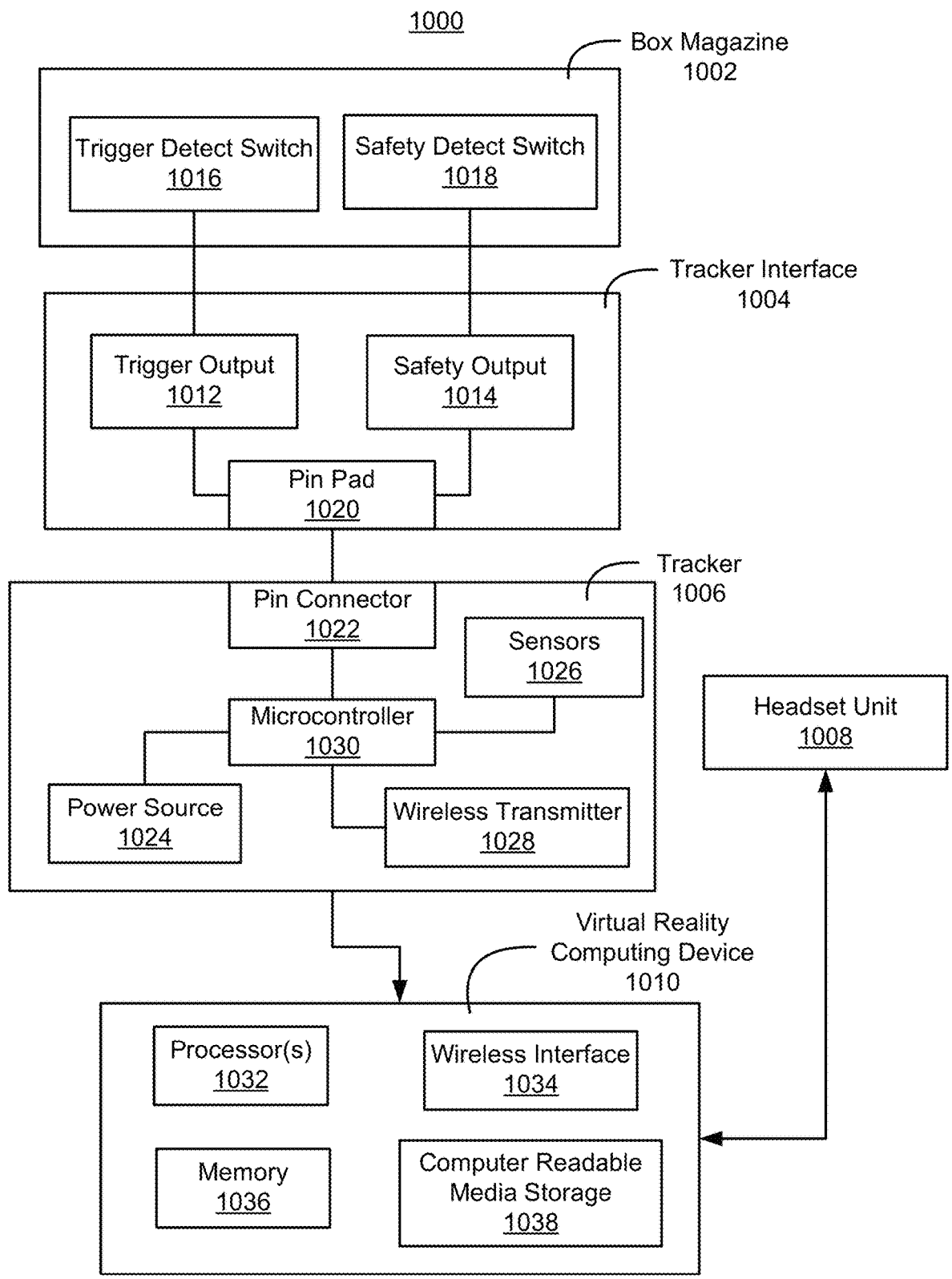
FIG. 10 illustrates a computing system according to an embodiment of the present invention.

FIG. 10 presents a computing system according to an embodiment of the present invention. A system 1000 may include box magazine 1002, tracker interface 1004, tracker 1006, headset unit 1008, and virtual reality computing device 1010. Box magazine 1002 may comprise a housing insertable into a magazine well of a gun and include a trigger detect switch 1016 and safety detect switch 1018. The trigger detect switch 1016 and safety detect switch 1018 may provide electrical connections or signals to indicate a pull of a trigger or a position of a safety, respectively.

The box magazine 1002 may be coupled to tracker interface 1004. The tracker interface 1004 may include trigger output 1012 and safety output 1014. Trigger detect switch 1016 may include a circuit component that opens and closes an electrical circuit to trigger output 1012. Similarly, safety detect switch 1018 may include a circuit component that opens and closes an electrical circuit to safety output 1014. According to other embodiment, trigger detect switch 1016 and safety detect switch 1018 may be in another housing that is coupled to box magazine 1002, or tracker interface 1004, or both. The electrical connections or signals corresponding to trigger output 1012 and safety output 1014 may be carried to given pins on pin pad 1020.

Tracker interface 1004 may be further coupled to tracker 1006. Tracker 1006 includes pin connector 1022, power source 1024, sensors 1026, wireless transmitter 1028, and microcontroller 1030. Pin pad 1020 may be communicatively or electrically connected to pin connector 1022. Power source 1024 may be connected to microcontroller 1030 and used by microcontroller 1030 to provide a voltage source to components within box magazine 1002 and tracker interface 1004 via pin connector 1022. As such, microcontroller 1030 may receive signals from closed electrical circuits connected to pin connector 1022 and transmit the signals to virtual reality computing device 1010 via wireless transmitter 1028. Virtual reality computing device 1010 may process or render the signals using processor(s) 1032 and transmit corresponding images to headset unit 1008 from wireless interface 1034.

Microcontroller 1030 may also provide power to sensors 1026 and wireless transmitter 1028 from power source 1024. Sensors 1026 can detect a position of tracker 1006 within the x, y and z coordinates of a space, as well as orientation including yaw, pitch and roll. From a user's perspective, a gun connected to tracker 1006 may be tracked when pointed up, down, left and right, tilted at an angle, or moved forward or backwards. Sensors 1026 may communicate where the gun is oriented to microcontroller 1030 which sends the data to virtual reality computing device 1010 for processing by processor(s) 1032 and renders corresponding images for transmission by wireless interface 1034 to headset unit 1008.

Headset unit 1008 may comprise a head mounted display, also including components similar to tracker 1006, that a user can place over the user's eyes. The headset unit 1008 may be configured to communication with the virtual reality computing device 1010 to provide display according to a virtual reality simulation program. Additionally, the headset unit 1008 may be configured with positioning and/or motion sensors to provide user motion inputs to virtual reality computing device 1010. When wearing the headset unit 1008, the view may shift as the user looks up, down, left and right. The view may also change if the user tilts their head at an angle or move their head forward or backward without changing the angle of gaze. Sensors on headset unit 1008 may communicate to processor(s) 1032 where the user is looking, and the processor(s) 1032 may render corresponding images to the head mounted display. Sensors, as disclosed herein, can detect signals of any form, including electromagnetic signals, acoustic signals, optical signals and mechanical signals.

Virtual reality computing device 1010 includes processor(s) 1032, wireless interface 1034, memory 1036, and computer readable media storage 1038. Processor(s) 1032 may be configured to execute virtual reality training software stored within memory 1036 and/or computer readable media storage 1038, to communicate data to and from memory 1036, and to control operations of the virtual reality computing device 1010. The processor(s) 1032 may comprise central processing units, auxiliary processors among several processors, and graphics processing units. Memory 1036 may include any one or combination of volatile memory elements (e.g., random access memory (RAM). Computer readable media storage 1038 may comprise non-volatile memory elements (e.g., read-only memory (ROM), hard drive, etc.). Wireless interface 1034 may comprise a network device operable to connect to a wireless computer network for facilitating communications and data transfer with tracker 1006 and headset unit 1008.

The virtual reality training software may comprise an audio/visual interactive interface that enables a trainee to interact with a three-dimensional first-person-view environment in training scenarios with tracker devices, such as a weapon including a virtual reality-enabled magazine assembly (e.g., comprising box magazine 1002, tracker interface 1004, and tracker 1006). Virtual reality computing device 1010 may receive signals or commands from tracker 1006 and headset unit 1008 to generate corresponding data (including audio and video data) for depiction in the virtual reality environment.

Figure 11:
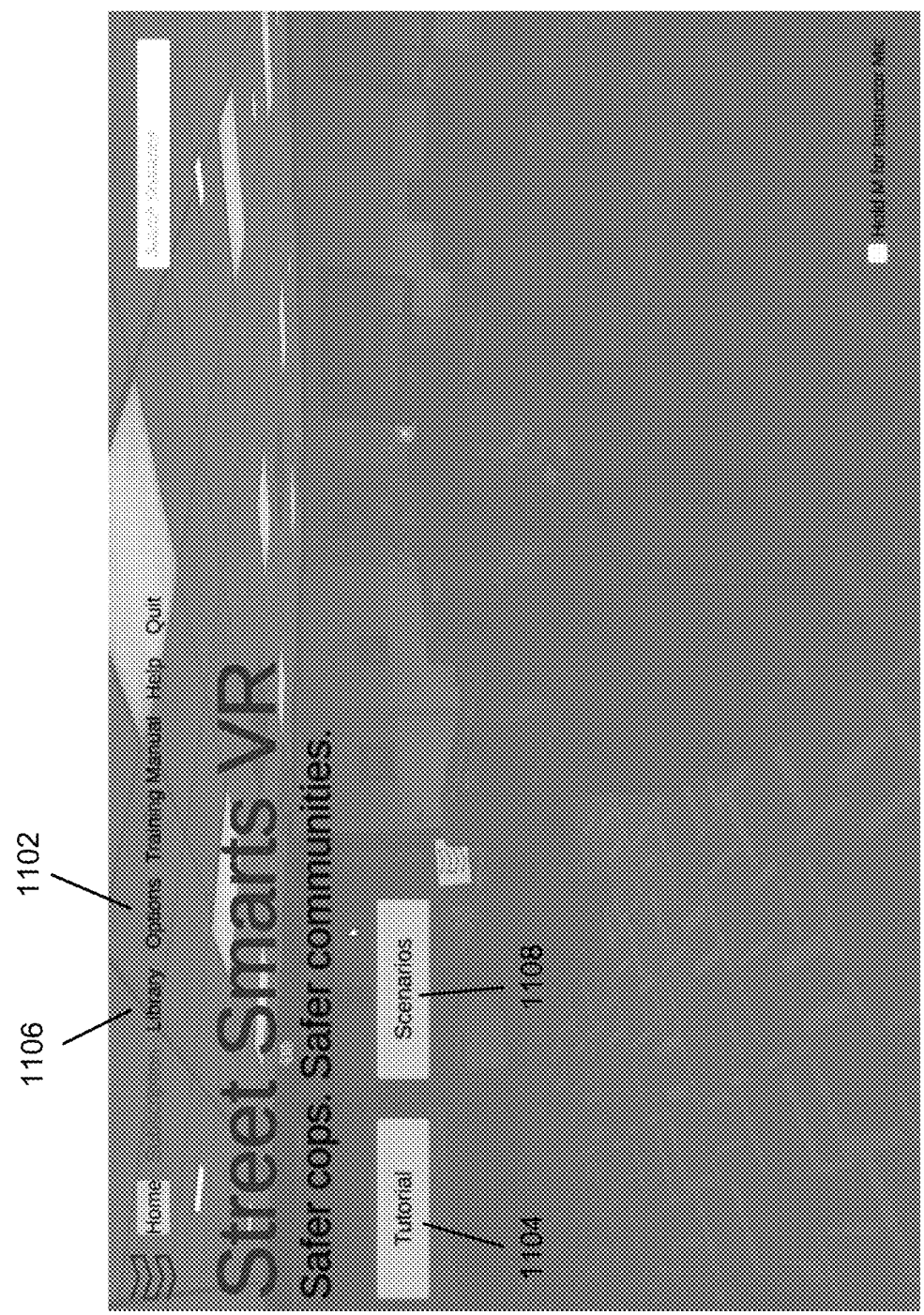
FIG. 11 illustrates an exemplary options menu of a virtual reality training software according to an embodiment of the present invention.
Figure 12:
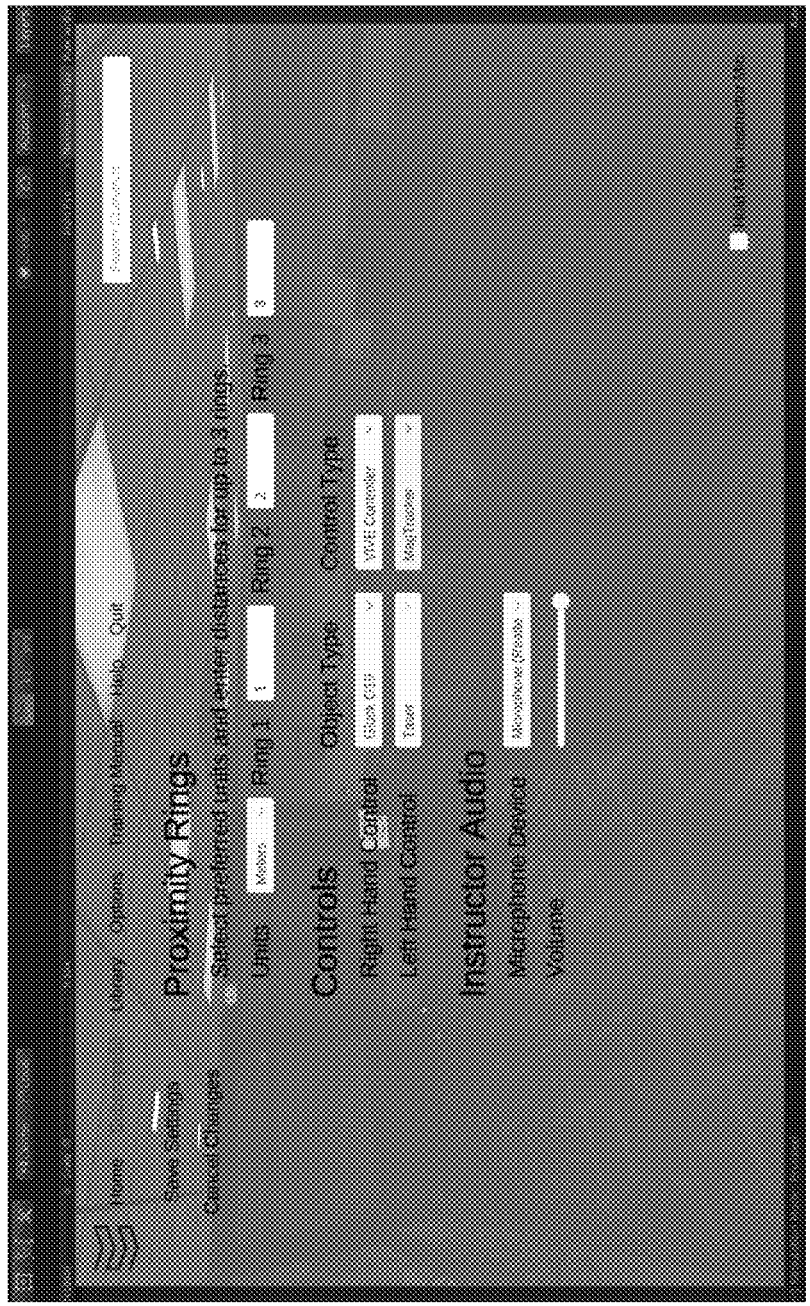
FIGS. 12 and 13 illustrate an exemplary options interface according to an embodiment of the present invention.
Figure 13:
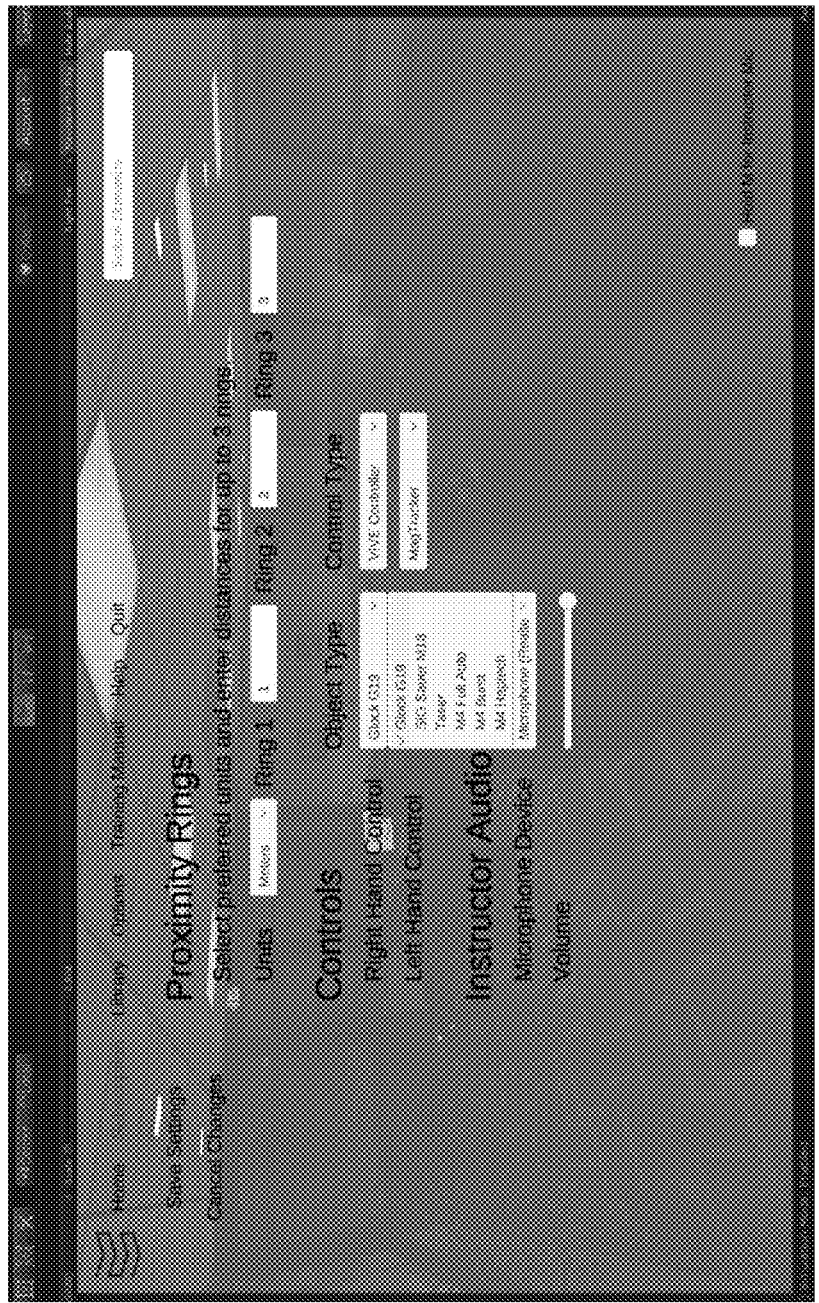

FIG. 11 presents an exemplary options menu of a virtual reality training software according to an embodiment of the present invention. The illustrated menu screen includes an "Options" 1102 that may be selected to adjust features. FIGS. 12 and 13 present an exemplary options interface according to an embodiment of the present invention. The "Options" 1102 may allow a user to configure settings for proximity rings, controls, and instructor audio.

Proximity rings may be configured for visually rendering different distances around a trainee that are visible in the headset unit. According to one embodiment, different actions may be prescribed for each proximity ring. That is, appropriate course of action may be determined based on a subject's distance from the trainee. Each proximity ring may be presented in a given color and distance that may be selected by the user. A user may select preferred units and enter distances for up to three rings.

Controls may be selected for each hand, as illustrated in FIG. 13, by clicking on dropdown menus. Object types may be selected to identify weapon(s) to be displayed and characterized by the virtual reality training software. Object types may include both lethal (e.g., gun) and non-lethal (e.g., electronic control) weapons. Control type may also be selected to identify controller devices used with the system. A user may select as a controller type either a weapon equipped with a magazine simulator as disclosed herein or a standard virtual reality controller.

The user may also selected a microphone device to be used to receive instructor audio. Instructor audio allows an instructor to speak into a microphone to play directly into a virtual reality headset unit while a trainee is wearing it during a training session. Volume of the instructor audio may also be selected by dragging a slider control. A "mute audio" may also be available to turn off this feature during scenario or review mode. While training is taking place, an instructor may be able to see what the trainee is looking at in the headset unit from a computer or secondary screen and speak to the trainee to provide instruction.

Figure 14:
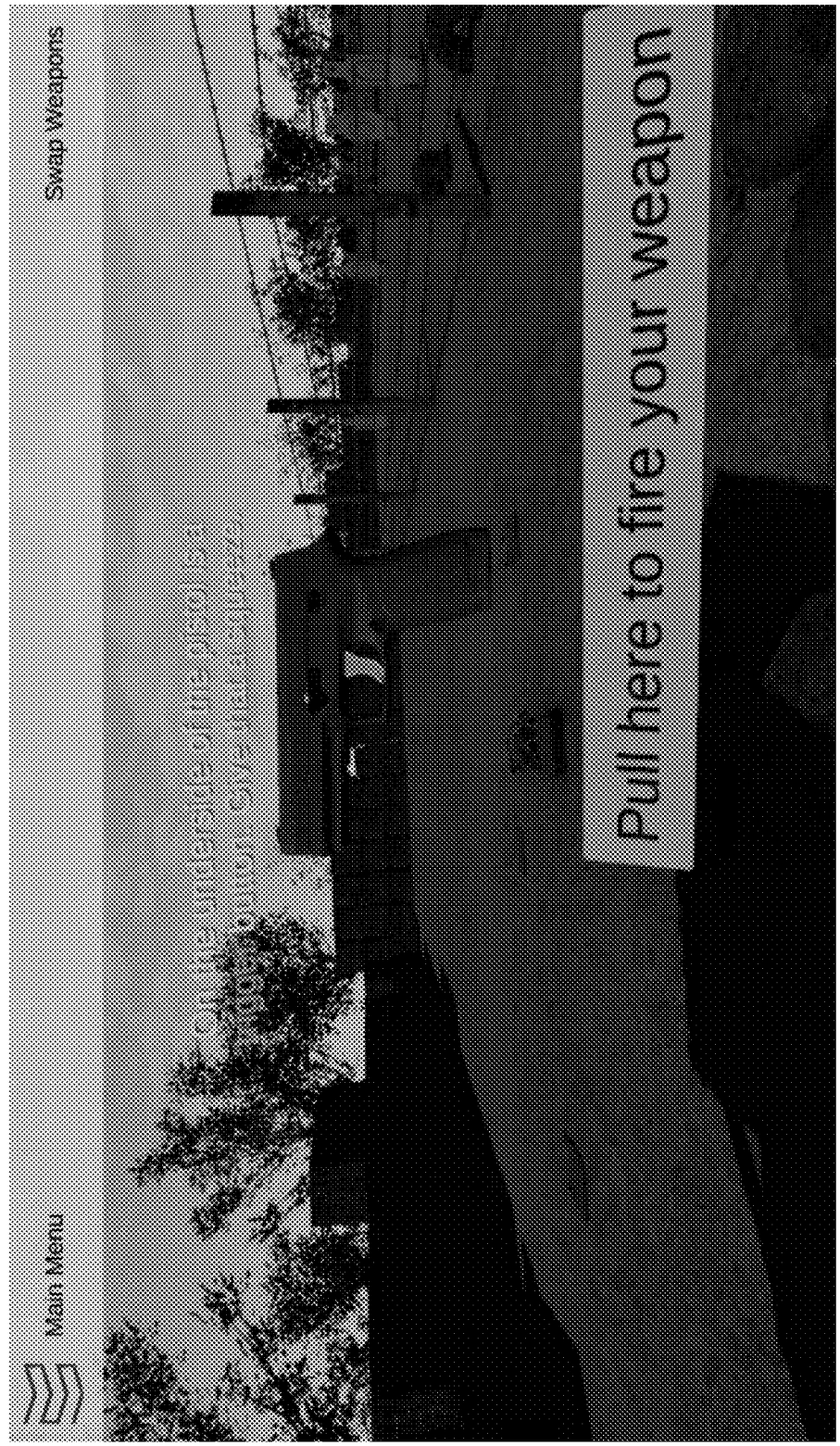
FIG. 14 illustrates an exemplary firing range screen according to an embodiment of the present invention.
Figure 15:
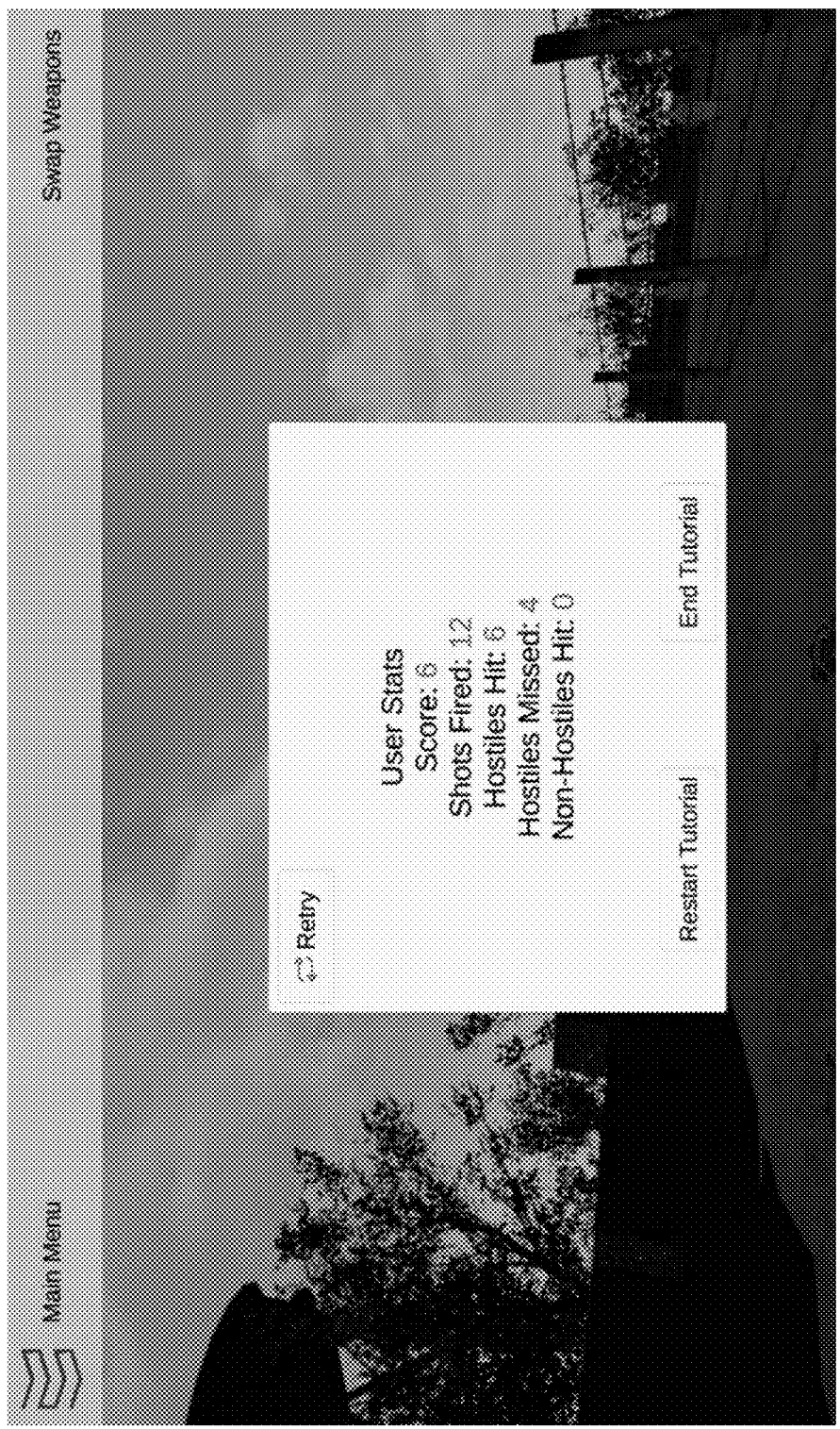
FIG. 15 illustrates an exemplary score screen according to an embodiment of the present invention.

Referring back to FIG. 11, a user may select "Tutorial" 1104 to open a virtual tutorial. The tutorial may generate instructions for a trainee to follow along with familiarizing the trainee in a virtual reality environment through a simulated firing range. FIG. 14 presents an exemplary firing range screen according to an embodiment of the present invention. On-screen instructions may appear and guide the trainee to unholster a weapon, fire the weapon, and reholster the weapon. FIG. 15 presents an exemplary score screen that may pop-up giving the trainee statistics on how they performed.

Figure 16:
FIG. 16 illustrates an exemplary scenario library screen according to an embodiment of the present invention.

Once again referring to FIG. 11, the menu screen also includes "Library" 1106 and "Scenarios" 1108 that may be selected to enter into a scenario library. FIG. 16 presents an exemplary scenario library screen according to an embodiment of the present invention. The scenario library may include a plurality of scenarios available for selection and execution by the virtual reality computing device. A scenario may comprise a programmed simulation containing a given situation, setting, characters, and actions. A user may filter scenarios by type, time of day, environment, and/or language on the scenario library screen.

Figure 17:
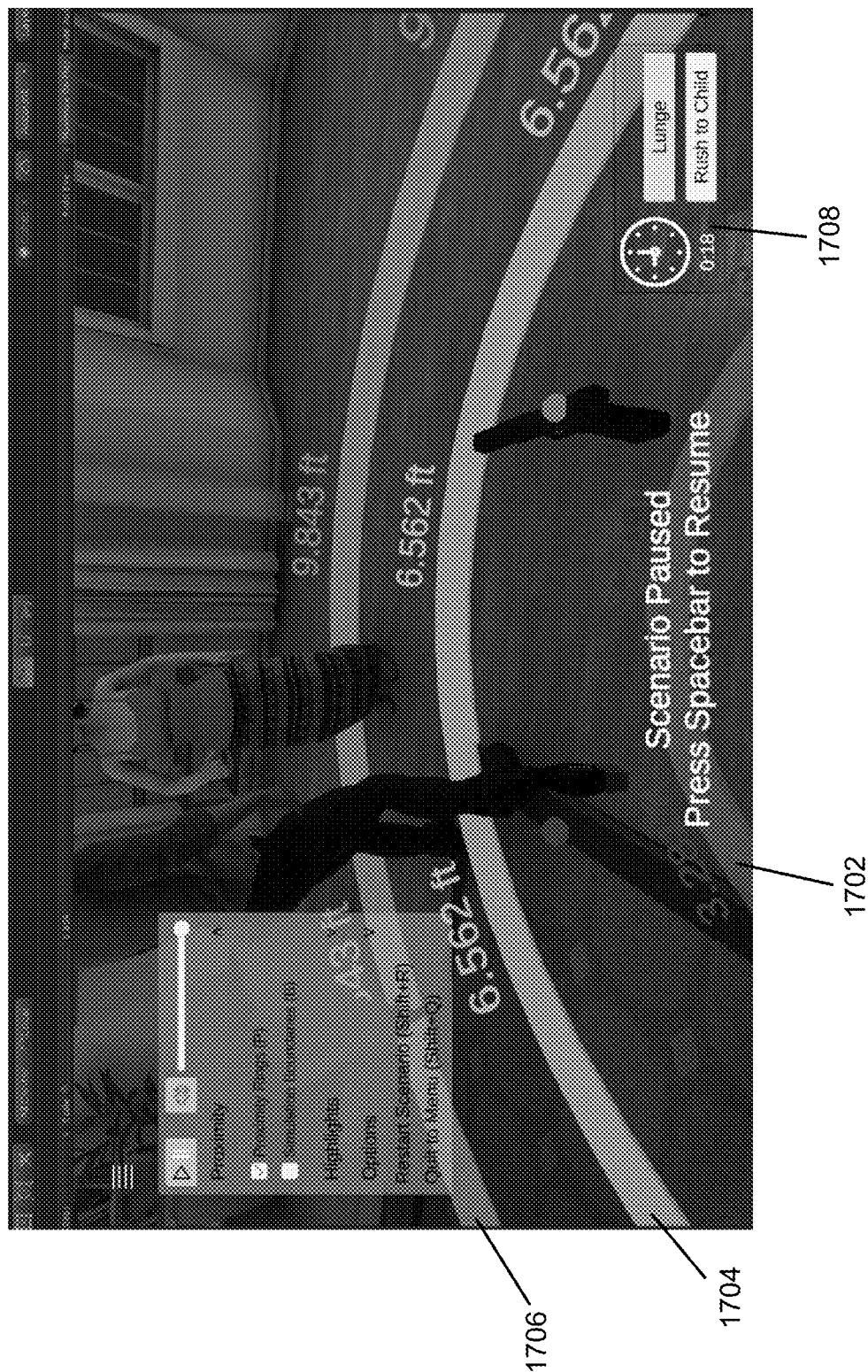
FIG. 17 illustrates an exemplary rendering of a scenario according to an embodiment of the present invention.

FIG. 17 presents an exemplary rendering of a scenario according to an embodiment of the present invention. Scenarios can be designed to place trainees in realistic situations requiring split-second decision making. A scenario may also feature branching options 1708 where an instructor may have the ability to pick an outcome based on options in the bottom right hand corner of the screen. The branching options feature may display the amount of time the instructor has to decide which outcome the trainee will receive. The instructor may select the outcome of the scenario until there is no more time on the clock. When the time runs out an outcome may be locked in and no further changes can be made. Scenarios may automatically have a default option selected if none is chosen.

During execution of a scenario, the instructor may access a menu of options by, for example, clicking in the top left corner of the screen. The menu may include options for proximity rings, simulation boundaries, and objects/weapons highlights. Proximity rings, as illustrated in FIG. 17, may be enabled and disabled for showing how far away the trainee is from different location points in the scenario. The proximity rings may be rendered to indicate distances from the trainee during a virtual reality scenario and in playback of the virtual reality scenario during a review mode.

For example, proximity rings 1702, 1704, and 1706 may be displayed to the trainee and recorded for review mode. Each of proximity rings 1702, 1704, and 1706 may be color coded and labeled with approximate radius distances away from the trainee. According to one embodiment, the proximity rings may be color coded based on distance safety. For example, proximity ring 1706 may be colored green to indicate a safe distance while proximity ring 1704 may be colored yellow to indicate a cautionary distance, proximity ring 1702 may be colored red to indicate a high-risk distance.

Simulation boundaries may indicate a "training area" where the virtual reality system is only able to track trainee activity. The simulation boundary may be based on a limitation of the physical environment where the virtual reality system is configured. Objects/weapons highlights may visually emphasize any weapons or objects in the scenario held by either the trainee or other people. Instructors may also have the capability to pause, resume, restart, or quit the scenario at any point.

Figure 18:
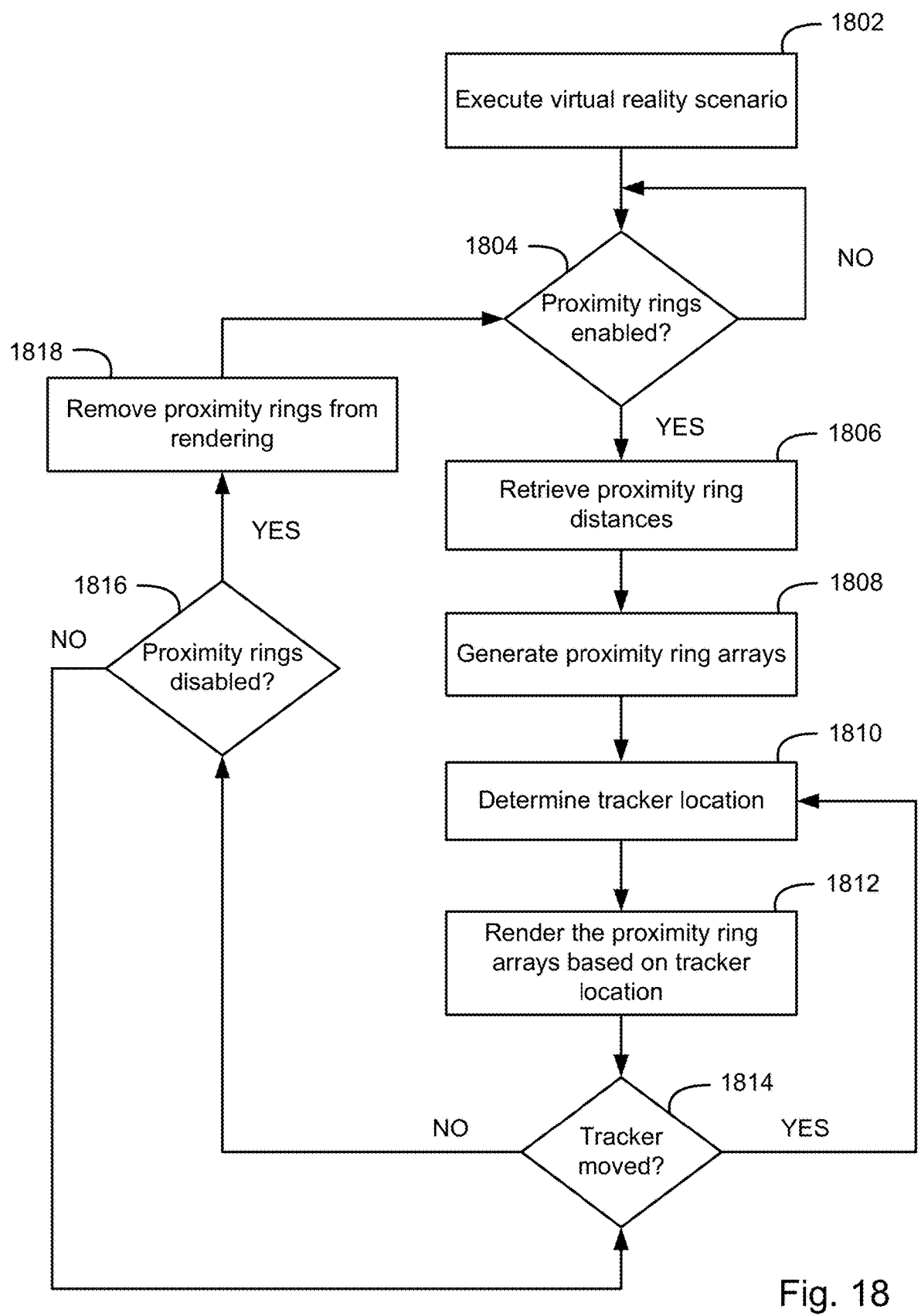
FIG. 18 illustrates a flowchart of a method for generating proximity rings according to an embodiment of the present invention.

FIG. 18 presents a flowchart of a method for generating proximity rings according to an embodiment of the present invention. A virtual reality scenario is executed by a virtual reality computing device, step 1802. The virtual reality computing device determines whether proximity rings enabled, step 1804. Proximity rings may be enabled at any point during the virtual reality scenario. Upon determining that proximity rings are enabled, the virtual reality computing device retrieve proximity ring distances, step 1806. The proximity ring distances may be retrieved from settings configured by a user including one or more rings and corresponding distances in a given unit of measure (e.g., feet, meters, etc.).

Proximity ring arrays are generated based on the proximity ring distances, step 1808. The proximity ring arrays may comprise data structures representative of the shape, size, and distances of the proximity rings. A tracker location is determined, step 1810. Tracker location may be a location of a magazine simulator including a virtual reality tracker that is determined by the virtual reality computing device. The tracker location may be used to approximate a location of a trainee to place the proximity rings. The proximity ring arrays are rendered based on the tracker location, step 1812.

The virtual reality computing device may monitor for movements of the tracker, step 1814. If the tracker has moved, the virtual reality computing device may return to step 1810 to determine the tracker location and update the rendering of the proximity ring arrays at step 1812. The method may further determine whether the proximity rings are disabled, step 1816. If proximity rings are not disabled, the virtual reality computing device may continue to monitor whether the tracker moved at step 1814. In the case that proximity rings are disabled, the virtual reality computing device proceeds to remove the proximity rings from rendering, step 1818. The virtual reality computing device returns to determine if proximity rings are enabled at step 1804.

Figure 19:
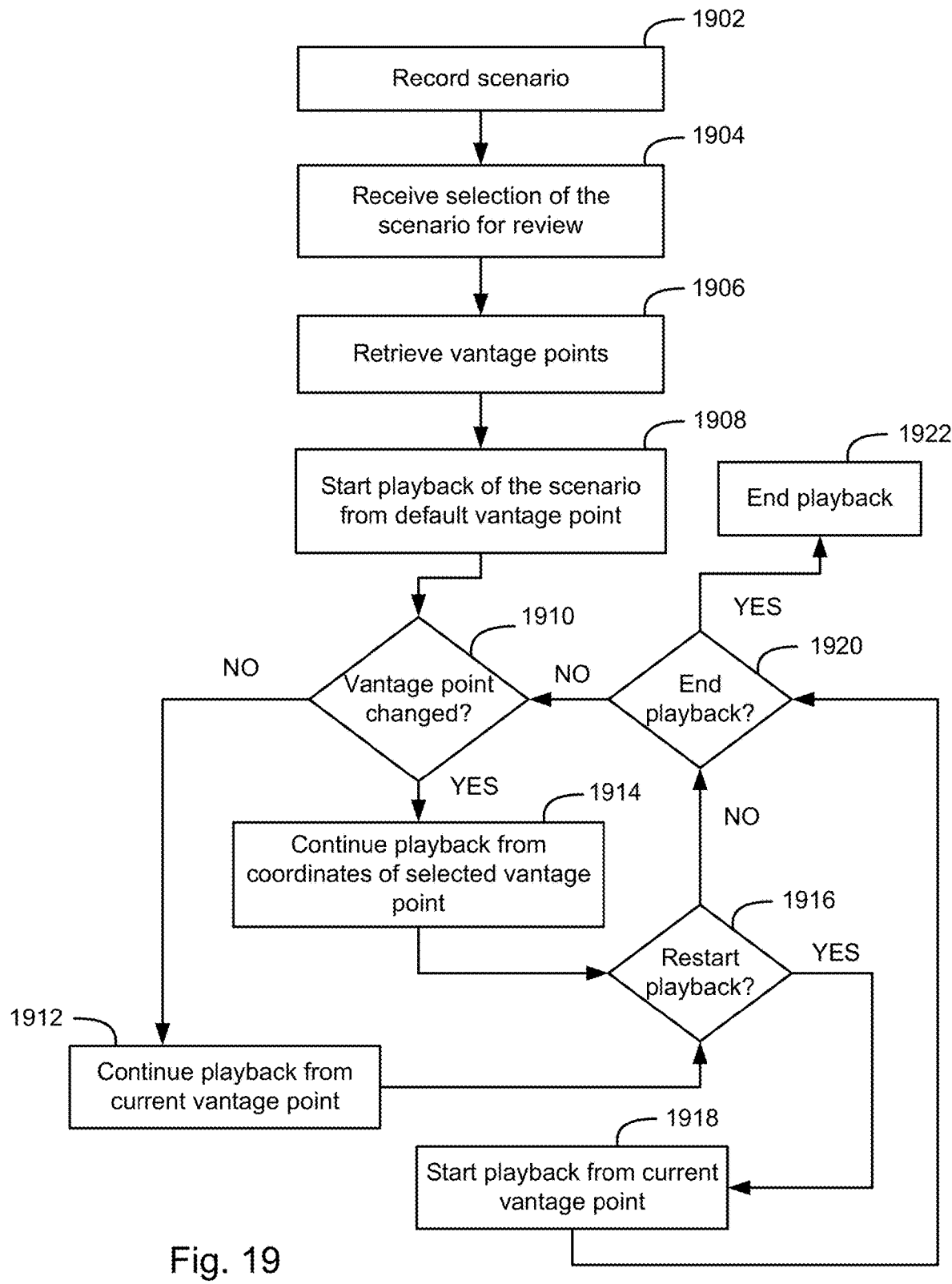
FIG. 19 illustrates a flowchart of a method for playback of scenarios under review mode according to an embodiment of the present invention.

The virtual reality computing device may generate a review mode including a playback of the virtual reality scenario, wherein the review mode allows observation of the trainee and movements of the trainee from a plurality of perspectives. FIG. 19 presents a flowchart of a method for playback of scenarios under review mode according to an embodiment of the present invention. A scenario of a trainee is recorded by the virtual reality computing device, step 1902. The recorded scenario may be stored to a database for retrieval during a review mode. The review mode may be used by instructors to go over and evaluate a trainee's performance during the scenario.

A selection of the scenario for review is received, step 1904. A given scenario may include predetermined vantage points based on parameters of the scenario, such as environment. For example, a scenario in a house may include vantage points from a plurality of rooms. Vantage points of the scenario are retrieved, step 1906. Playback of the scenario is started from a default vantage point, step 1908. The virtual reality computing device may determine if a vantage point has been changed based on a user selection, step 1910. The scenario will continue playback of the scenario from a current vantage point if there are no changes to the vantage point, step 1912. If the vantage point has been changed, the virtual reality computing device may continue playback from coordinates of a selected vantage point, step 1914.

At step 1916, the virtual reality computing system determines if playback of the scenario is restarted. If yes, playback of the scenario is started from the current vantage point, step 1918. Otherwise, the virtual reality computing device may proceed to determine whether to end playback, either by end of scenario or by user command, step 1920. If playback is determined to end, the playback of the scenario is ended, step 1922. Otherwise, the method continues to determine if vantage point has been changed at step 1910.

Figure 20:
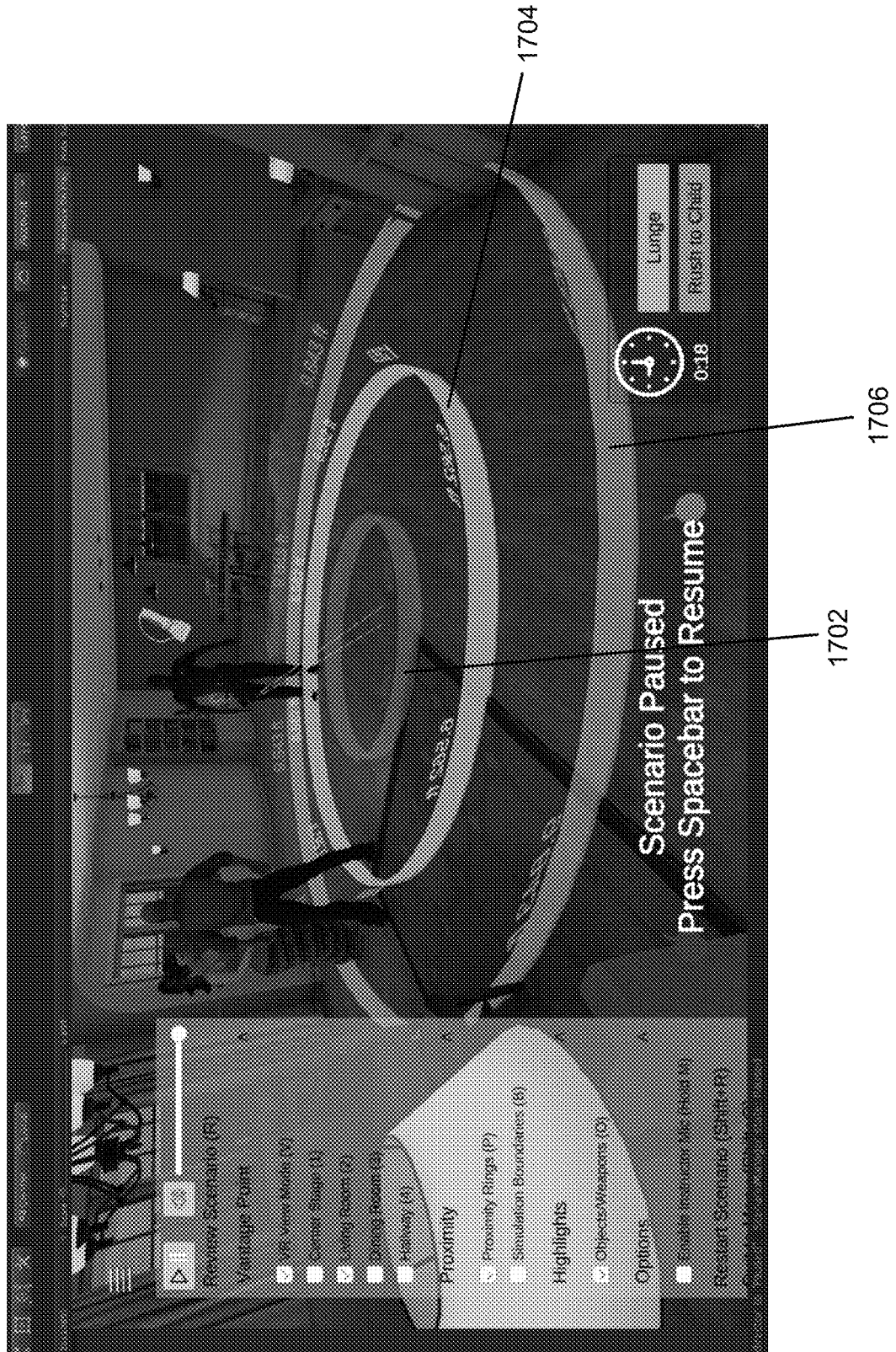
FIGS. 20 and 21 illustrate exemplary screens of a scenario under review mode according to an embodiment of the present invention.
Figure 21:
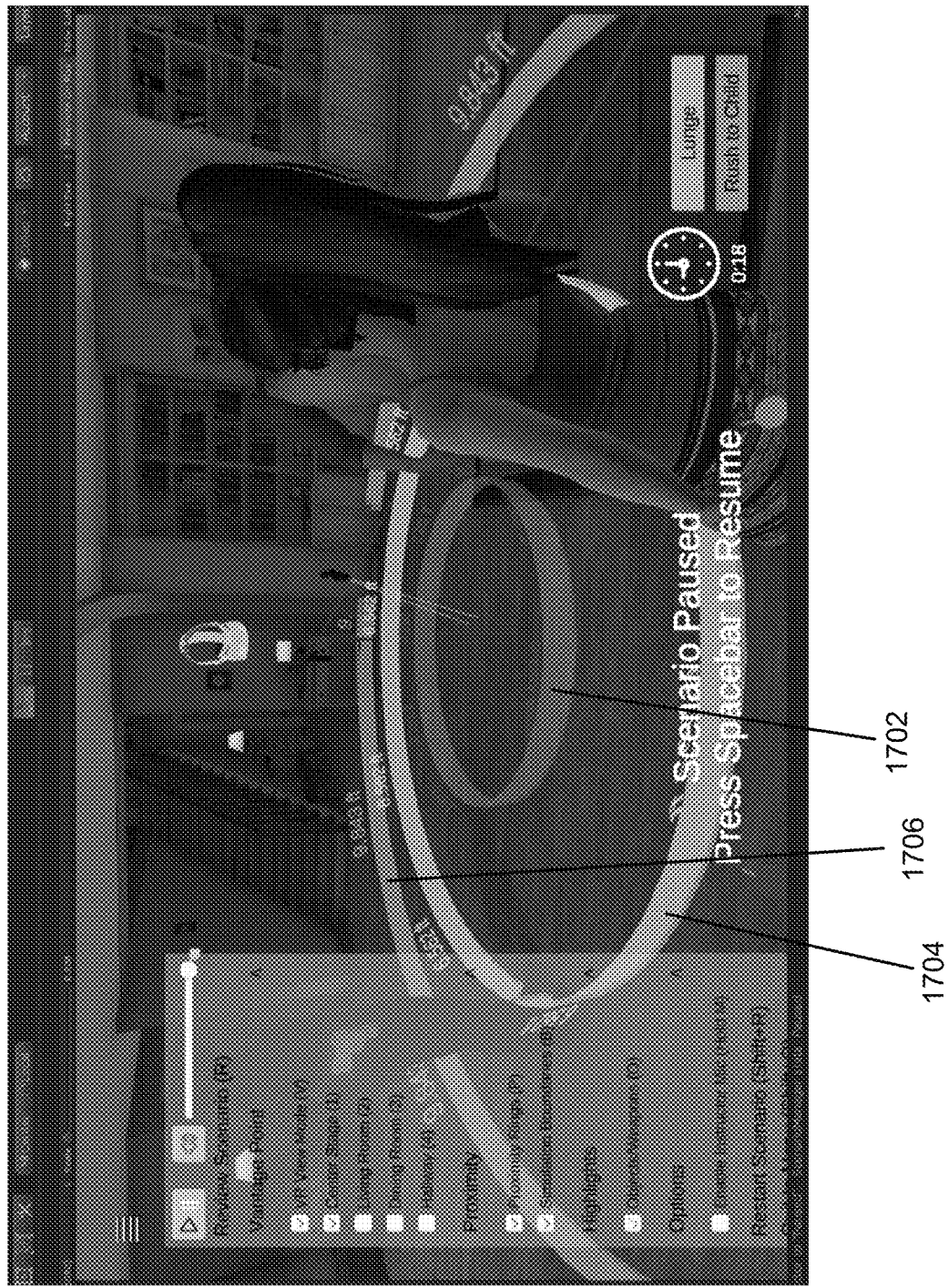

FIGS. 20 and 21 present exemplary screens of a scenario under review mode according to an embodiment of the present invention. Once a scenario is over, an instructor may be able to access a review mode of the scenario to review a trainee's performance utilizing a variety of overlay and control features. The review mode may provide a menu of options for selecting vantage point, proximity rings, simulation boundaries, objects/weapons highlights, instructor audio, pause/resume playback of scenario, restarting the scenario, and quit.

Vantage point may allow an instructor to review training scenarios from different angles. For example, FIG. 20 depicts a playback of a scenario from a "Living Room" vantage point while FIG. 21 depicts a playback of the scenario from a "Center Stage" vantage point. Other vantage points that may be viewed for the illustrated scenario include "Dining Room" and "Hallway." Availability of vantage points may depend on the scenario environment. The instructor may also view the playback of the scenario from a perspective of the headset (e.g., what the trainee saw). This feature allows showing of multiple angles from which the instructor can play back a scene. Reviewing from different angles may allow an instructor to watch how the trainee reacted, where they were looking as the scene unfolded as well as many other things.

Figure 22:
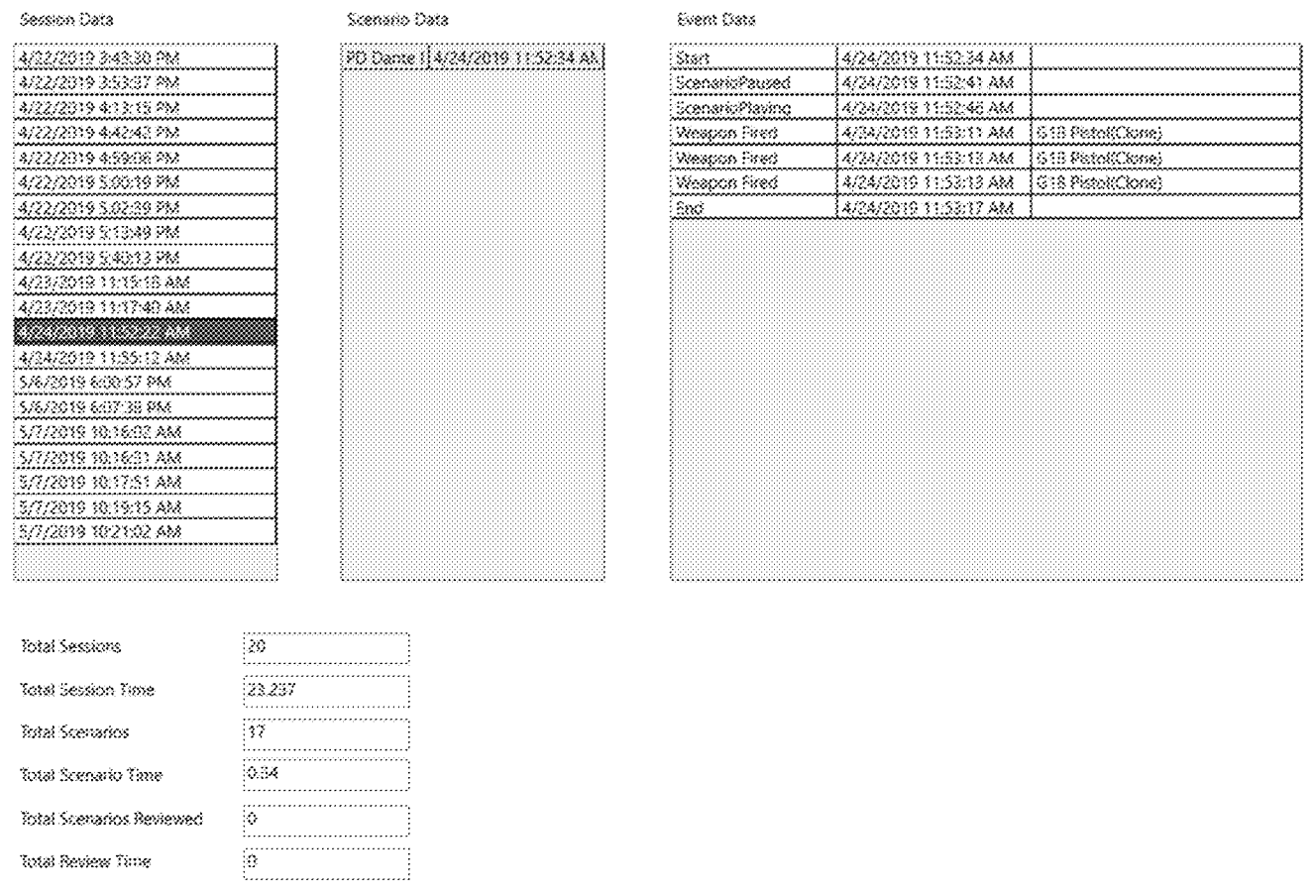

The virtual reality training software may further generate analytics data from training sessions. FIG. 22 presents an exemplary analytics screen according to an embodiment of the present invention. Data from the training sessions may be tracked, such as user location, headset view angle, weapon angle and firing, branching events, and state of simulation. The analytics may also capture particular frames and timestamps associated with certain events.

FIGS. 1 through 22 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps). In software implementations, computer software (e.g., programs or other instructions) and/or data is stored on a machine-readable medium as part of a computer program product and is loaded into a computer system or other device or machine via a removable storage drive, hard drive, or communications interface. Computer programs (also called computer control logic or computer-readable program code) are stored in a main and/or secondary memory, and executed by one or more processors (controllers, or the like) to cause the one or more processors to perform the functions of the invention as described herein. In this document, the terms "machine readable medium," "computer-readable medium," "computer program medium," and "computer usable medium" are used to generally refer to media such as a random access memory (RAM); a read only memory (ROM); a removable storage unit (e.g., a magnetic or optical disc, flash memory device, or the like); a hard disk; or the like.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

What is claimed is:

1. A virtual reality system comprising:
a virtual reality computing device that is communicatively coupled to a simulation device, the virtual reality computing device comprising a hardware processor and memory comprising instructions that, when executed by the hardware processor, configure the hardware processor to:
  determine a location of a trainee based on a location of the simulation device;
  monitor for movements and signals from the simulation device;
  render a simulation of a virtual reality scenario to the trainee and depict data in the simulation of the virtual reality scenario based on the monitored movements and signals from the simulation device; and
  render a proximity ring to the trainee in the simulation based on the location of the simulation device, on ring characteristic data stored in one or more data structures and on a selection obtained by the virtual reality computing device from an instructor to enable the rendering of the proximity ring to the trainee in the simulation, the ring characteristic data comprising an indication of a shape, size and distance from the location of the trainee at which the proximity ring is to be rendered; and
  enter a review mode after at least a portion of the simulation of the virtual reality scenario is completed by the trainee, the review mode being configured to render a playback of the at least a portion of the simulation of the virtual reality scenario.

2. The virtual reality system of claim 1 wherein the review mode is configured to allow a user to observe the trainee and movements of the trainee in the playback of the simulation of the virtual reality scenario from a plurality of perspectives, at least one of the plurality of perspectives having been predefined by the virtual reality scenario prior to the rendering of the simulation.

3. The virtual reality system of claim 2 wherein the plurality of perspectives include at least a trainee perspective and vantage perspectives.

4. The virtual reality system of claim 2 wherein the virtual reality scenario includes predetermined perspectives based on environment parameters of the virtual reality scenario.

5. The virtual reality system of claim 2 wherein the review mode includes overlay and control features utilized to review performance of the trainee in the virtual reality scenario, the overlay and control features including a menu of options for selecting: a vantage point, to enable or disable rendering of the proximity ring, simulation boundaries, or objects/weapons highlights.

6. The virtual reality system of claim 1 wherein the instructions further configure the hardware processor to generate instructor audio that plays microphone output to the trainee during the simulation.

7. The virtual reality system of claim 1 wherein the instructions further configure the hardware processor to:
render a plurality of proximity rings including the proximity ring, each proximity ring being rendered at a different distance from the trainee in the simulation; and
prescribe different actions to each of the plurality of proximity rings, the different actions including appropriate courses of action by the trainee that are based on the indicated distances with respect to a subject.

8. The virtual reality system of claim 7 wherein the instructions further configure the hardware processor to render each of the proximity rings in given colors based on distance.

9. The virtual reality system of claim 1 wherein the virtual reality scenario includes branching options that determine outcomes of the virtual reality scenario based on instructor selections.

10. The virtual reality system of claim 1 wherein the instructions further configure the hardware processor to disable rendering of the proximity ring based on a selection obtained by the virtual reality computing device from the instructor to disable the rendering of the proximity ring to the trainee in the simulation.

11. A method, in a data processing system comprising a virtual reality computing device comprising a hardware processor executing instructions that perform the method comprising:
- determining a location of a trainee based on a location of a simulation device that is communicatively coupled to the virtual reality computing device;
- monitoring for movements and signals from the simulation device;
- rendering a simulation of a virtual reality scenario to the trainee and depicting data in the simulation of the virtual reality scenario based on the monitored movements and signals from the simulation device; and
- rendering a proximity ring to the trainee in the simulation based on the location of the simulation device, on ring characteristic data stored in one or more data structures and on a selection obtained by the virtual reality computing device from an instructor to enable the rendering of the proximity ring to the trainee in the simulation, the ring characteristic data comprising an indication of a shape, size and distance from the location of the trainee at which the proximity ring is to be rendered; and
- entering a review mode after at least a portion of the simulation of the virtual reality scenario is completed by the trainee, the review mode rendering a playback of the at least a portion of the simulation of the virtual reality scenario.

12. The method of claim 11 wherein the review mode allows a user to observe the trainee and movements of the trainee in the playback of the simulation of the virtual reality scenario from a plurality of perspectives, at least one of the plurality of perspectives having been predefined by the virtual reality scenario prior to the rendering of the simulation.

13. The method of claim 12 wherein the plurality of perspectives include at least a trainee perspective and vantage perspectives.

14. The method of claim 12 wherein the virtual reality scenario includes predetermined perspectives based on environment parameters of the virtual reality scenario.

15. The method of claim 12 wherein the review mode includes overlay and control features utilized to review performance of the trainee in the virtual reality scenario, the overlay and control features including a menu of options for selecting: a vantage point, to enable or disable rendering of the proximity ring, simulation boundaries, or objects/weapons highlights.

16. The method of claim 11 further comprising generating instructor audio that plays microphone output to the trainee during the simulation.

17. The method of claim 11 further comprising:
- render a plurality of proximity rings including the proximity ring, each proximity ring being rendered at a different distance from the trainee in the simulation; and
- prescribing different actions to each of the plurality of proximity rings, the different actions include appropriate courses of action by the trainee that are based on the indicated distances with respect to a subject.

18. The method of claim 17 further comprising rendering each of the proximity rings in given colors based on distance.

19. The method of claim 11 wherein the virtual reality scenario include branching options that determine outcomes of the virtual reality scenario based on instructor selections.

20. The method of claim 11 wherein the method further comprises disabling rendering of the proximity ring based on a selection obtained by the virtual reality computing device from the instructor to disable the rendering of the proximity ring to the trainee in the simulation.

* * * * *

UNITED STATES PATENT AND TRADEMARK OFFICE
CERTIFICATE OF CORRECTION

| | | |
|---|---|---|
| PATENT NO. | : 11,674,772 B2 | Page 1 of 1 |
| APPLICATION NO. | : 16/930060 | |
| DATED | : June 13, 2023 | |
| INVENTOR(S) | : Alice Formwalt and Jeffrey Jarrard | |

It is certified that error appears in the above-identified patent and that said Letters Patent is hereby corrected as shown below:

On the Title Page

Item (12): "Formwait et al." should read --Formwalt et al.--

Item (72) Inventors: "Alice Formwait" should read --Alice Formwalt--

Signed and Sealed this
First Day of April, 2025

Coke Morgan Stewart
*Acting Director of the United States Patent and Trademark Office*